United States Patent
Happel

(10) Patent No.: US 10,238,993 B1
(45) Date of Patent: *Mar. 26, 2019

(54) DUAL SCREEN TREATMENT SYSTEMS WITH DEBRIS RAMPS AND SCREENED DEFLECTORS

(71) Applicant: Suntree Technologies Holdings, LLC, Cocoa, FL (US)

(72) Inventor: Tom Happel, Cocoa, FL (US)

(73) Assignee: Suntree Technologies Holdings, LLC, Cocoa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,737

(22) Filed: Aug. 17, 2018

Related U.S. Application Data

(63) Continuation-in-part of application No. 15/639,685, filed on Jun. 30, 2017, now Pat. No. 10,202,285, and
(Continued)

(51) Int. Cl.
*E03F 5/14* (2006.01)
*B01D 21/24* (2006.01)
(Continued)

(52) U.S. Cl.
CPC ..... *B01D 21/2405* (2013.01); *B01D 21/0012* (2013.01); *B01D 21/0042* (2013.01);
(Continued)

(58) Field of Classification Search
CPC ......... E03F 5/0403; E03F 5/0404; E03F 5/14; B01D 21/0012; B01D 21/003;
(Continued)

(56) References Cited

U.S. PATENT DOCUMENTS

| 122,209 A | 12/1871 | Ashman |
| 232,948 A | 10/1880 | Dernham |
| (Continued) | | |

FOREIGN PATENT DOCUMENTS

| CA | 2455239 | 7/2005 |
| JP | 2004353407 | 12/2004 |

OTHER PUBLICATIONS

Rising and Non-Rising Stem, Telescoping Valves, Halliday Products, retrieved on Jun. 15, 2009, retrieved from www.hallidayproducts.com/ssg.html, 4 pages.
(Continued)

*Primary Examiner* — Christopher Upton
(74) *Attorney, Agent, or Firm* — Brian S. Steinberger; Law Offices of Brian S. Steinberger, P.A.

(57) ABSTRACT

Vaults, boxes, systems, and methods of treatment systems to capture pollutants from storm water runoff and prevent the conveyance of these pollutants from entering a receiving water body or landscape area, which is designed to be a part of a local permanent storm water drainage infrastructure. A single treatment box, vault and system combines both drainage conveyance, multi-level treatment techniques, variable hydraulic capabilities, and easy and inexpensive methods for servicing the system. A flow spreader having a triangular shape with straight sides, or concave sides or convex sides can split incoming water to pass into dual screen filtration systems. Additionally, an upwardly angled debris ramp above a downwardly angled screened defector can be located on both sides of the flow spreader to help direct debris and trash into dual screened boxes. The system can also include components selected from a shelf beneath the spreader, at least one baffle, skimmer, deflectors, media filtration and hydroslide water pressure lines with spray heads for cleaning debris on a sloped floor.

20 Claims, 19 Drawing Sheets

Related U.S. Application Data a continuation-in-part of application No. 14/288,455, filed on May 28, 2014, now abandoned.

(60) Provisional application No. 62/506,188, filed on May 15, 2017, provisional application No. 61/828,958, filed on May 30, 2013.

(51) Int. Cl.

| | | |
|---|---|---|
| *B01D 21/00* | (2006.01) | |
| *B01D 21/02* | (2006.01) | |
| *B01D 29/52* | (2006.01) | |
| *B01D 29/90* | (2006.01) | |
| *B01D 29/01* | (2006.01) | |
| *B01D 29/66* | (2006.01) | |
| *B01D 29/56* | (2006.01) | |
| *C02F 1/00* | (2006.01) | |
| *C02F 3/06* | (2006.01) | |
| *E03F 1/00* | (2006.01) | |
| *E03F 5/04* | (2006.01) | |
| *C02F 103/00* | (2006.01) | |

(52) U.S. Cl.
CPC ......... *B01D 21/0087* (2013.01); *B01D 21/02* (2013.01); *B01D 21/2433* (2013.01); *B01D 21/2472* (2013.01); *B01D 29/01* (2013.01); *B01D 29/52* (2013.01); *B01D 29/56* (2013.01); *B01D 29/66* (2013.01); *B01D 29/902* (2013.01); *C02F 1/004* (2013.01); *C02F 3/06* (2013.01); *E03F 1/00* (2013.01); *E03F 5/0403* (2013.01); *E03F 5/0404* (2013.01); *E03F 5/14* (2013.01); *C02F 2001/007* (2013.01); *C02F 2103/001* (2013.01); *C02F 2201/002* (2013.01)

(58) Field of Classification Search
CPC ............ B01D 21/0087; B01D 21/2472; B01D 21/2483; B01D 24/02; B01D 35/02; C02F 2103/001
USPC .......... 210/162, 170.03, 265, 299, 304, 305, 210/311, 747.2, 747.3
See application file for complete search history.

(56) References Cited

U.S. PATENT DOCUMENTS

| | | |
|---|---|---|
| 587,559 A | 8/1897 | Riley |
| 664,945 A | 1/1901 | Guion |
| 783,556 A | 2/1905 | Van Buskirk |
| 809,201 A | 1/1906 | Lutz |
| 920,961 A | 5/1909 | Keil |
| 1,060,338 A | 4/1913 | Gschwind |
| 1,442,348 A | 1/1923 | McDermet |
| 1,935,642 A | 11/1933 | Laughlin |
| 2,010,540 A | 8/1935 | Evans |
| 2,102,310 A | 12/1937 | Egan |
| 2,182,795 A | 12/1939 | Day |
| 2,263,259 A | 11/1941 | Boosey |
| 2,360,961 A | 10/1944 | Mayo |
| 2,436,793 A | 3/1948 | Danel |
| 2,485,755 A | 10/1949 | Loosli |
| 2,559,784 A | 7/1951 | Moore |
| 2,615,526 A | 10/1952 | Lane |
| 2,652,946 A | 9/1953 | Beatty |
| 2,796,988 A | 6/1957 | Loffler |
| 3,091,339 A | 5/1963 | Marra et al. |
| 3,237,915 A | 3/1966 | Palmer et al. |
| 3,282,430 A | 11/1966 | Kinne |
| 3,527,348 A | 9/1970 | Lalonde et al. |
| 3,631,983 A | 1/1972 | Mail |
| 4,024,881 A | 5/1977 | Weiland |
| 4,070,863 A | 1/1978 | Brown |
| 4,189,386 A | 2/1980 | Aman |
| 4,198,717 A | 4/1980 | Kessel |
| 4,278,190 A | 7/1981 | Oory et al. |
| 4,297,219 A | 10/1981 | Kirk et al. |
| 4,308,141 A | 12/1981 | Clendenen |
| 4,326,952 A | 4/1982 | Blake |
| 4,422,931 A | 12/1983 | Wolde-Michael |
| 4,509,717 A | 4/1985 | Wright et al. |
| 4,668,405 A | 5/1987 | Boze |
| 4,689,145 A | 8/1987 | Mathews et al. |
| 4,738,644 A | 4/1988 | Happel |
| 4,765,889 A | 8/1988 | Grujanac |
| 4,785,966 A | 11/1988 | Waltke |
| 4,895,653 A | 1/1990 | Cherochak |
| 4,913,819 A | 4/1990 | Patterson |
| 5,034,122 A | 7/1991 | Wiesemann |
| 5,037,541 A | 8/1991 | Ruey-Jang et al. |
| 5,069,781 A | 12/1991 | Wilkes |
| 5,114,274 A | 5/1992 | Heiler |
| 5,133,619 A | 7/1992 | Murfae et al. |
| 5,176,838 A | 1/1993 | Chin |
| 5,232,587 A | 8/1993 | Hegemier et al. |
| 5,284,580 A | 2/1994 | Shyh |
| 5,372,714 A | 12/1994 | Logue, Jr. |
| 5,378,376 A | 1/1995 | Zenner |
| 5,397,464 A | 3/1995 | Hannon |
| 5,403,474 A | 4/1995 | Emery |
| 5,405,539 A | 4/1995 | Schneider |
| 5,480,254 A | 1/1996 | Autry et al. |
| 5,486,287 A | 1/1996 | Murphy et al. |
| 5,498,331 A | 3/1996 | Monteith |
| 5,518,024 A | 5/1996 | Weeks et al. |
| 5,535,554 A | 7/1996 | Harris, Jr. |
| 5,562,819 A | 10/1996 | Turner, Jr. et al. |
| 5,575,925 A | 11/1996 | Logue, Jr. |
| 5,632,889 A | 5/1997 | Tharp |
| 5,643,445 A | 7/1997 | Billias et al. |
| 5,670,039 A | 9/1997 | Harris |
| 5,779,888 A | 7/1998 | Bennett |
| 5,810,510 A | 9/1998 | Urriola |
| 5,820,762 A | 10/1998 | Bamer et al. |
| 5,855,774 A | 1/1999 | Boelter |
| 5,904,842 A | 5/1999 | Billias et al. |
| 5,980,740 A | 11/1999 | Harms et al. |
| 5,985,157 A | 11/1999 | Leckner et al. |
| 6,032,421 A | 3/2000 | Yamada |
| 6,077,448 A | 6/2000 | Tran-Quoc-Nam et al. |
| 6,086,756 A | 7/2000 | Roy |
| 6,086,758 A | 7/2000 | Schilling et al. |
| 6,099,743 A | 8/2000 | Pedersen |
| 6,106,706 A | 8/2000 | Roy et al. |
| 6,106,707 A | 8/2000 | Morris et al. |
| 6,125,865 A | 10/2000 | Bacon Cochrane |
| 6,149,803 A | 11/2000 | Diloreto, Jr. et al. |
| 6,178,565 B1 | 1/2001 | Franco |
| 6,190,545 B1 | 2/2001 | Williamson |
| 6,200,484 B1 | 3/2001 | McInnis |
| 6,231,758 B1 | 5/2001 | Morris et al. |
| 6,270,663 B1 | 8/2001 | Happel |
| 6,287,459 B1 | 9/2001 | Williamson |
| 6,294,095 B1 | 9/2001 | Lewis |
| 6,315,897 B1 | 11/2001 | Maxwell |
| 6,334,953 B1 | 1/2002 | Singleton |
| 6,379,541 B1 | 4/2002 | Nicholas |
| 6,428,692 B2 | 8/2002 | Happel |
| 6,478,954 B1 | 11/2002 | Turner, Jr. et al. |
| 6,517,709 B1 | 2/2003 | Cardwell et al. |
| 6,531,059 B1 | 3/2003 | Morris et al. |
| 6,537,446 B1 | 3/2003 | Sanguinetti |
| 6,551,023 B2 | 4/2003 | Allard |
| 6,562,233 B1 | 5/2003 | Schilling et al. |
| 6,638,424 B2 | 10/2003 | Stever et al. |
| 6,651,825 B2 | 11/2003 | Turner, Jr. et al. |
| 6,666,974 B2 | 12/2003 | Page |
| 6,668,390 B1 | 12/2003 | Gonzalez |
| 6,733,665 B1 | 5/2004 | Khalil |
| 6,797,161 B2 | 9/2004 | Use et al. |
| 6,797,162 B2 | 9/2004 | Happel |

(56) References Cited

U.S. PATENT DOCUMENTS

| | | |
|---|---|---|
| 6,800,195 B1 | 10/2004 | Batten et al. |
| 6,824,677 B2 | 11/2004 | Martinez |
| 6,866,153 B2 | 3/2005 | Turner, Jr. et al. |
| 6,869,525 B1 | 3/2005 | Happel |
| 6,872,029 B2 | 3/2005 | Allard et al. |
| 6,884,343 B2 | 4/2005 | Harris et al. |
| 6,936,163 B2 | 8/2005 | Use et al. |
| 6,939,461 B2 | 9/2005 | Use et al. |
| 6,951,607 B2 | 10/2005 | Use et al. |
| 6,974,540 B1 | 12/2005 | Fleischmann |
| 6,976,808 B2 | 12/2005 | Allard |
| 6,979,148 B2 | 12/2005 | Happel et al. |
| 6,986,621 B2 | 1/2006 | Allard |
| 6,994,783 B2 | 2/2006 | Use et al. |
| 6,998,039 B2 | 2/2006 | Harris et al. |
| 7,005,060 B2 | 2/2006 | Pitt |
| 7,011,743 B2 | 3/2006 | Use et al. |
| 7,083,721 B2 | 8/2006 | McClure et al. |
| 7,094,337 B2 | 8/2006 | Williams et al. |
| 7,094,338 B2 | 8/2006 | Morris et al. |
| 7,112,274 B1 | 9/2006 | Sanguinetti |
| 7,128,341 B1 | 10/2006 | Dahl et al. |
| 7,128,832 B2 | 10/2006 | Wade |
| 7,132,045 B1 | 11/2006 | Trangsrud |
| 7,153,417 B2 | 12/2006 | Happel |
| 7,156,987 B1 | 1/2007 | Sanguinetti |
| 7,270,747 B2 | 9/2007 | Happel et al. |
| 7,282,142 B2 | 10/2007 | Kraft |
| 7,288,188 B2 | 10/2007 | Al-Assfour |
| 7,294,256 B2 | 11/2007 | Happel et al. |
| 7,309,420 B1 | 12/2007 | Trangsrud |
| 7,328,809 B2 | 2/2008 | Gigas et al. |
| 7,396,471 B2 | 7/2008 | Wimberger |
| 7,488,414 B2 | 2/2009 | Wimberger |
| 7,494,585 B2 | 2/2009 | Nino |
| 7,524,414 B1 | 4/2009 | Barragan |
| 7,549,820 B1 | 6/2009 | Happel |
| 7,658,857 B2 | 2/2010 | Wacome |
| 7,662,280 B1 | 2/2010 | Cooney |
| 7,771,591 B2 | 8/2010 | Lucas |
| 7,785,464 B2 | 8/2010 | Happel |
| 7,815,800 B2 | 10/2010 | Komatsu |
| 7,824,551 B2 | 11/2010 | Wanielista et al. |
| 7,846,327 B2 | 12/2010 | Happel et al. |
| 7,883,620 B2 | 2/2011 | Owen |
| 7,897,047 B2 | 3/2011 | Wanielista et al. |
| 7,927,484 B2 | 4/2011 | Wanielista et al. |
| 7,955,507 B2 | 6/2011 | Wanielista et al. |
| 7,959,799 B2 | 6/2011 | Happel et al. |
| 7,981,283 B2 | 7/2011 | Happel |
| 7,981,300 B2 | 7/2011 | Wacome |
| 8,002,984 B1 | 8/2011 | Wanielista et al. |
| 8,002,985 B1 | 8/2011 | Wanielista et al. |
| 8,017,006 B2 | 9/2011 | Lopez |
| 8,034,234 B2 | 10/2011 | Happel |
| 8,034,236 B1 | 10/2011 | Happel |
| 8,034,237 B2 | 10/2011 | Happel et al. |
| 8,038,879 B2 | 10/2011 | Kraft |
| 8,051,568 B2 | 11/2011 | Moody et al. |
| 8,083,937 B2 | 12/2011 | Happel |
| 8,101,079 B1 | 1/2012 | Wanielista et al. |
| 8,142,666 B1 | 3/2012 | Happel |
| 8,153,005 B1 | 4/2012 | Wanielista et al. |
| 8,216,453 B2 | 7/2012 | Moody et al. |
| 8,221,632 B2 | 7/2012 | McInnis et al. |
| 8,231,780 B2 | 7/2012 | Happel |
| 8,252,182 B1 | 8/2012 | Chang et al. |
| 8,366,923 B1 | 2/2013 | Happel |
| 8,393,827 B1 | 3/2013 | Happel |
| 8,425,150 B1 | 4/2013 | Happel |
| 8,491,797 B1 | 7/2013 | Happel |
| 8,622,652 B1 | 1/2014 | Happel |
| 8,651,767 B1 | 2/2014 | Happel |
| 8,658,044 B2 | 2/2014 | Cobb |
| 8,974,144 B1 | 3/2015 | Happel |
| 9,068,312 B1 | 6/2015 | Happel |
| 9,340,965 B2 | 5/2016 | Happel |
| 9,534,368 B1 | 1/2017 | Happel |
| 2001/0047954 A1 | 12/2001 | Happel |
| 2003/0026659 A1 | 2/2003 | Wu |
| 2003/0089652 A1 | 5/2003 | Matsui |
| 2003/0121846 A1 | 7/2003 | Use et al. |
| 2003/0132150 A1 | 7/2003 | Happel |
| 2003/0136717 A1 | 7/2003 | Tseng |
| 2003/0172487 A1 | 9/2003 | Thompson et al. |
| 2003/0175079 A1 | 9/2003 | Happel et al. |
| 2004/0065601 A1 | 4/2004 | Martinez |
| 2004/0222159 A1 | 11/2004 | Peters, Jr. et al. |
| 2004/0222170 A1 | 11/2004 | Hauge |
| 2004/0226869 A1 | 11/2004 | McClure et al. |
| 2005/0051499 A1 | 3/2005 | Nino |
| 2005/0069386 A1 | 3/2005 | Happel et al. |
| 2005/0183997 A1 | 8/2005 | Happel et al. |
| 2005/0218049 A1 | 10/2005 | Happel |
| 2006/0016767 A1 | 1/2006 | Olson |
| 2006/0086676 A1 | 4/2006 | Smith |
| 2006/0096935 A1 | 5/2006 | Harding |
| 2006/0163130 A1 | 7/2006 | Happel et al. |
| 2006/0201860 A1 | 9/2006 | Happel et al. |
| 2006/0207922 A1 | 9/2006 | Dussich |
| 2008/0006304 A1 | 1/2008 | Treherne |
| 2009/0045135 A1 | 2/2009 | Khudenko et al. |
| 2009/0114579 A1 | 5/2009 | Dyer |
| 2009/0134081 A1 | 5/2009 | Happel |
| 2009/0166279 A1 | 7/2009 | Happel et al. |
| 2010/0032363 A1 | 2/2010 | Happel |
| 2010/0078370 A1 | 4/2010 | Happel |
| 2011/0168612 A1 | 7/2011 | Happel |
| 2011/0278237 A1 | 11/2011 | McInnis |
| 2012/0073675 A1 | 3/2012 | Dupuis |
| 2014/0102479 A1 | 4/2014 | Steffen |
| 2014/0352729 A1 | 12/2014 | Happel |
| 2015/0114893 A1 | 4/2015 | Moll |
| 2015/0129473 A1 | 5/2015 | Kent |
| 2015/0183659 A1 | 7/2015 | Kent |
| 2015/0258472 A1 | 9/2015 | Kent |
| 2017/0342698 A1 | 11/2017 | Fink |

OTHER PUBLICATIONS

Aluminum Slide and Weir Glass, Water and Waste Water Valves and Gates, retrieved on Jun. 15, 2009, retrieved from http://ncvg.net/products/alumslideweir.html, 10 pages.

Happel, Utility U.S. Appl. No. 14/151,284, filed Jan. 9, 2014, Office Action Summary dated Dec. 24, 2014, 12 pages.

Applied Polymer Systems, Inc., Polymer Enhanced Best Management Practice (PEBMP) Application Guide, Revised 2016, 83 pages.

Technical Guidance for the Use of Polyacrylamides (PAM) and PAM Blends for Soil Erosion Control and Storm Water Clarification, Applied Polymer Systems, Inc., Nov. 2002, 8 pages.

Applied Polymer Systems, Inc., APS 800 Series Pond Long, retrieved from http://siltstop.com/p.php?go=pinfo&PID=333-aps_800_series_pond_log, retrieved Aug. 28, 2017, 3 pages.

Applied Polymer Systems, Inc., Water Treatment, retrieved from http://siltstop.com/p.php?go=pinfo&PID=15-water_treatment, retrieved on Aug. 28, 2017, 8 pages.

Stormwater Best Management Practice, Polymer Flocculation, United States Environmental Protection Agency, Oct. 2013, http://www.siltstop.com/pictures/US_EPA_Polymer_Flocculant_Handout_3-14.pdf, 7 pages.

Happel, T., Utility U.S. Appl. No. 15/639,685, filed Jun. 30, 2017, Office Action Summary dated Aug. 10, 2018, 7 pages.

Happel, T., Utility U.S. Appl. No. 15/248,202, filed Aug. 26, 2016, Office Action Summary dated Jun. 1, 2018, 10 pages.

Spantek, Expanded Metal, Expanded Metal Patterns, no date available, 4 pages.

Bioclean, Debris Separating Baffle Box, Dual Stage Hydrodynamic Separator, no date available, 2 pages.

DUAL SCREEN TREATMENT SYSTEMS WITH DEBRIS RAMPS AND SCREENED DEFLECTORS

CROSS REFERENCE TO RELATED APPLICATIONS

This application is a Continuation-In-Part of U.S. patent application Ser. No. 15/639,685 filed Jun. 30, 2017, which claims the benefit of priority to U.S. Provisional Patent Application Ser. No. 62/506,188 filed May 15, 2017, and U.S. patent application Ser. No. 15/639,685 is a Continuation In Part of U.S. patent application Ser. No. 14/288,455 filed May 28, 2014, now abandoned, which claims the benefit of priority to U.S. Provisional Application Ser. No. 61/828,958 filed May 30, 2013. The entire disclosure of each of the applications listed in this paragraph are incorporated herein by specific reference thereto.

FIELD OF INVENTION

This invention relates to water detention and treatment, and in particular to vaults, boxes, systems, and methods of treatment systems to capture pollutants from storm water runoff and prevent the conveyance of these pollutants from entering a receiving water body or landscape area, which is designed to be a part of a local permanent storm water drainage infrastructure, where a single treatment system combines both drainage conveyance, multi-level treatment techniques, variable hydraulic capabilities, and easy and inexpensive methods for servicing the system.

BACKGROUND AND PRIOR ART

Since the passage of the Clean Water Act in 1972 the federal government through the Environmental Protection Agency (EPA) has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as storm water management.

Devices, systems and procedures that remove or reduce the pollutants and contaminates and/or control peak flows and volumes are often referred to as best management practices (BMPs). The BMPs can utilize natural, artificial or man-made techniques, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands.

BMPs typically use one or more mechanisms to remove the pollutants and contaminates. These mechanisms include sedimentation, filtration, absorption, adsorption, flocculation, stripping, leaching, bioremediation, and chemical processes including oxidation reduction, ion exchange, and precipitation.

Furthermore, storm water treatment systems can also be classified in relationship to the treatment level in which they are being used. In this respect, the term treatment is generally used to describe the unit processes that are used to reduce the quantities of pollutants and containments in storm water runoff.

For example, basic or pre-treatment typically refers to the removal of gross solids, sediments and larger debris through the processes of settling and screening. Enhanced or advanced treatment typically refers to processes or reducing targeted pollutants.

Filtration is a common form of enhanced treatment for storm water. Filtration utilizes a combination of physical, chemical, and biological processes. Types of filtration greatly vary dependent on the media use. Medias can be both inert and/or sorbent and are also strongly linked to natural biological processes that thrive in and/or around the media environment. Advanced filtration techniques especially include chemical and biological processes and generally include, but are not limited to processes that bring storm water in contact with plants including both macrophytes and microphytes. And the plants are both visible and invisible to the naked eye.

The reduction of nutrients that are conveyed via storm water runoff are in the forefront of the various pollutants of concern. For example; the EPA (Environmental Protection Agency) has mandated that the state of Florida reduce the overall pollutant discharge of the state by approximately ⅓. To this end the EPA has established a numeric nutrient criterion for all water bodies of the state for total phosphorus (TP) and total nitrogen (TN). These nutrient numeric values cannot be exceeded within these water bodies of the state. The result of exceeding these numeric values will result with the state of Florida being fined by the EPA.

Common pollutants typically found in storm water flow can include sediment, foliage, litter, nutrients, metals, hydrocarbons, and bacteria. Because pollutants vary significantly in their respective physical characteristics, a variety of techniques are applied to better address difficulties with capturing the pollutants. For example; capturing hydrocarbons, which are typically in a liquid state, require a different technique than capturing litter which are in a solid state.

Storm water treatment systems that make use of filtration media can vary significantly just by making use of different types of filtration media. Understanding that effectiveness will vary for different types of filtration media, has filtration media functions by combining the processes of physical filtration, sorbent or reactive surfaces, and biological activity.

Physical filtration will physically prevent the conveyance of solids, sorbent or reactive surfaces will chemically bond to the pollutants, and the biological activity will consume pollutants. Physical filtration whether by use of a filtration media or a screen can be an effective technique for capturing solids. Contained within and attached to the solids are a wide spectrum of pollutants of concern that can range from nutrients, to litter, to bacteria. A difficulty with physical filtration is that the collected solids can become so numerous that the rate of filtration is slowed to an ineffective flow rate. Servicing of the filtration media is typically required, and the servicing often requires the media to be replaced as a part of servicing.

Filtration media will have sorbent or reactive surfaces that vary in effectiveness depending on the type of media. For storm water treatment applications, the media is granular in shape. However, the reactivity of the media surfaces is limited by the number of receptors on the surface of the media.

Making use of media that has a lot of surface area will increase the number of available receptors. A common method to increasing the surface area of the media is using media that is small in granular size. However, the smaller the granular size of the media the more likely the media will be to bind due to the collection of solids within the media. In addition, the receptors can be binded by solids which prevent the water flow from reaching the surface of the media granules.

Because there is not a single storm water treatment technique that is the best for removing all pollutants of concern, a treatment system that combines multiple techniques in a treatment train arrangement will likely yield a wide spectrum of storm water treatment success. In addition, there is an economic consideration for applying storm water treatment. For example; the costs and frequency for servicing a storm water treatment system will be an indicator as to the sustainability of the system, and all storm water treatment systems require servicing.

Thus, the need exists for solutions to the above problems with the prior art.

SUMMARY OF THE INVENTION

An objective of the present invention is to provide vaults, boxes, systems, and methods of using treatment systems to capture pollutants from storm water runoff and prevent the conveyance of these pollutants from entering a receiving water body or landscape area, which is designed to be a part of a local permanent storm water drainage infrastructure, where the system combines both drainage conveyance, multi-level treatment techniques, variable hydraulic capabilities, and easy and inexpensive methods for servicing the invention.

Storm water pollution prevention system that prevents the conveyance of a wide spectrum of pollutants from being conveyed to a receiving body of water or landscape area, and incorporates multiple stages and processes for the treatment of water that is shed from an area as a result of rain.

The system incorporates hydro-dynamic separation, screen filtration with or without media filtration all in a single treatment system. This treatment system can be divided into distinct zones by baffles that span the width of the vault. These baffles will help to isolate solids that settle in the lower settling chambers from turbulent water flow. In addition, the use of a skimmer baffle will help to prevent the conveyance of floatables. For additional treatment, filtration media can be added between the skimmer baffle and the outflow pipe.

Because the cross-sectional conveyance through the treatment system is much greater than that of the inflow pipe, as water enters into the vault the linear velocity of the water flow is reduced. In addition, the inflowing water hits onto a flow spreader located not far from the inflow pipe. This flow spreader will influence the spreading of the flow wide while creating a vortex to the left and right of the inflowing water. The vortex created to the left and right of the flow spreader will influence solids to settle into the lower settling chambers. A deflector located along the underside of the flow spreader will aid with preventing the turbulent water entering the treatment system from scouring previously captured sediments. Essentially, a calm zone is created below the horizontal deflector. This zone can enable fine particles to settle while preventing previously captured fine particles from being re-suspended out of this settling zone.

After the storm water flow has been spread wide by the flow spreader, the flow will enter into the body of a screen system (dual screen systems) located on each side of the vault. The primary purpose of the dual screen systems is capture floating debris such as litter and foliage. As water flow and floating debris enters into the dual screen systems, water can pass through the screens and the floating debris can be retained within the screens.

The dual screens can be positioned within the vault so that the bottom of the screen systems can be above the invert elevation of the outflow pipe. After the rain event has ended the hydraulic gradeline within the vault will lower to an elevation equal to that of the outflow pipe invert. Because the captured debris in the screen systems is higher in elevation than that of the water level retained in the vault, the captured debris will be stored in a dry state between rain events. Storing the captured debris in a dry state between rain events can prevent the pollutants contained in the floating debris from diffusing into the water over time.

Once the water flow exits the dual screen systems a skimmer located between the screen systems and the outflow pipe can act to prevent floatables from being conveyed downstream.

During heavy rain events when the stormwater flows are very high and the hydraulic grade line (hgl) in the treatment system is adequately elevated, it is possible that the hgl will be higher than the top of the flow spreader and/or dual debris capture screen systems. During high flowing rain events it may become necessary for water flow to bypass the flow spreader, screen systems, and skimmer to prevent flooding upstream within the water shed basin. Because the width of the treatment vault is significantly greater than that of the inflow and outflow conveyances, the potential conveyance through the treatment vault is very high when the hgl is above the specialized interior components.

If the debris capture screen systems become blinded by debris and the potential flow through the screens is minimized, the blinding may cause the hgl to rise above the top of the flow spreader and screen systems, and water flow can bypass the screens. Bypassing water flow can be important to prevent possible flooding of the upstream watershed basin. Because the width of the treatment vault is significantly greater than that of the inflow and outflow conveyances, the potential conveyance through the treatment vault is very high when the hgl is above the specialized interior components.

For additional treatment, filtration media can be placed between the skimmer and the outflow pipe. The filtration media can be contained within vessels or a screen system so that the water flow cannot dislodge the media and wash it down stream. Water flow can be diverted downward by the skimmer, and then the water flow will upflow through the media. As the water passes through the media sorbent surfaces, physical filtration, and biological activity can act to capture pollutants.

In the event that a large rain event occurs and the water level within the treatment system rises in elevation above the screen systems and skimmer, water flow can convey above all the specialized components of the treatment system. The cross-sectional conveyance through the vault, and above the screen systems and skimmer, far exceeds that of the inflow and outflow pipes. Because the potential water conveyance above all the specialized components of the treatment system is so great, then potential upstream flooding is avoided.

Eventually, the treatment system requires servicing. The high pressure water servicing system can dramatically reduce the required time to remove the captured debris in the lower chambers. The servicing system has high water pressure jets that will flush captured debris toward the center of the settling chambers. These jets will liquefy the captured debris from underneath, turn the captured debris into a slurry, and then flush the debris slurry toward the center of the settling chambers so that a vacuum truck can easily remove the slurry.

The use of this high pressure servicing system avoids the need for a service technician to enter the vault to perform servicing. The regulations set by OSHA for personnel to enter a confined space, such as a storm water treatment system for servicing, are complicated, time consuming, and costly.

Various problems solved by this invention are as follows:
1) Sediments, other solids, and their associated pollutants, are captured and retained by the treatment system and prevented from being conveyed to a receiving downstream water body.
2) Floatables like litter, foliage, and their associated pollutants, are captured by the dual screen systems and retained by the treatment system and prevented from being conveyed to a receiving downstream water body. Because the solids captured by the dual screen system are stored at an elevation above the static water level, their associated pollutants are not diffused into the water below.
3) The skimmer will help to prevent floatables that get past the screen systems from being conveyed out of the treatment system.
4) Dissolved pollutants can be captured by the filtration are retained within the treatment system and prevented from being conveyed to a receiving downstream water body.
5) Servicing the treatment system can dramatically made easier by the high water pressure servicing system. Serving the lower settling chambers can be accomplished in a fraction of the time required by other treatment system, you get all the debris out, and a technician does not have to go inside the vault. Having a technician enter a vault treatment system for servicing is problematic because of OSHA (Occupational Safety and Health Administration) confined space rules. With the invention, nobody has to enter the vault which keeps people safe and save time and money.

Further objects and advantages of this invention will be apparent from the following detailed description of the presently preferred embodiments which are illustrated schematically in the accompanying drawings.

BRIEF DESCRIPTION OF THE FIGURES

First Embodiment Dual Vortex Baffle Box/Vault/System with Flow Spreader and Screened Deflector and Debris Ramp

Second Embodiment, Includes First Embodiment with Media

Figure 12:
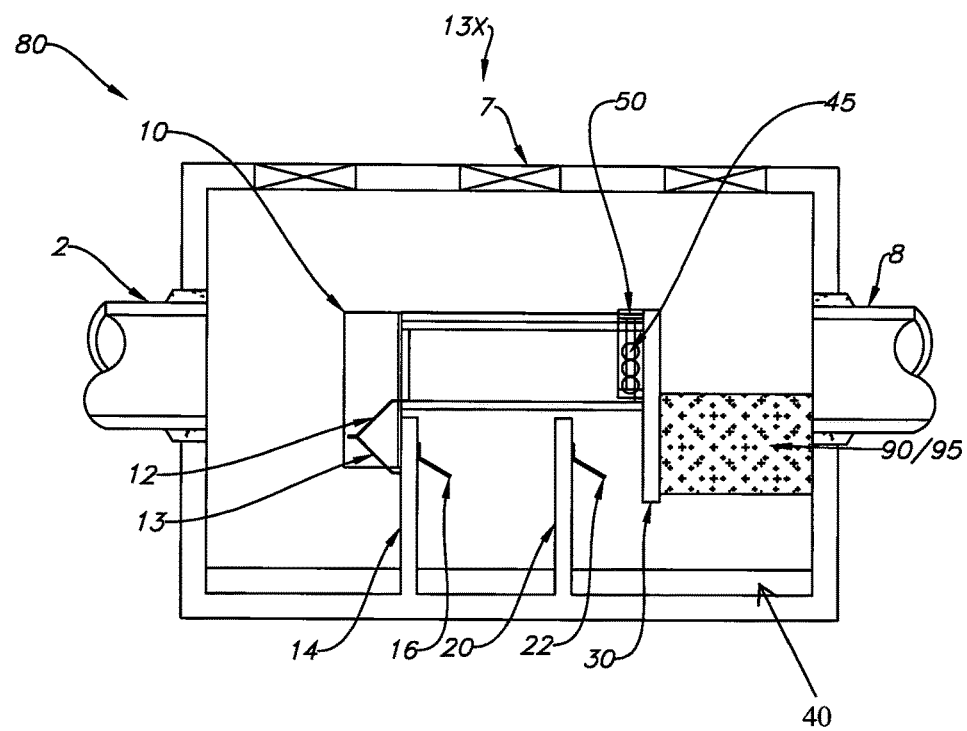

FIG. 12 is a side cross sectional view of a second embodiment dual vortex baffle box/vault system with flow spreader, debris ramp, screened deflector, dual screen systems and screened media vessel.

Figure 13:
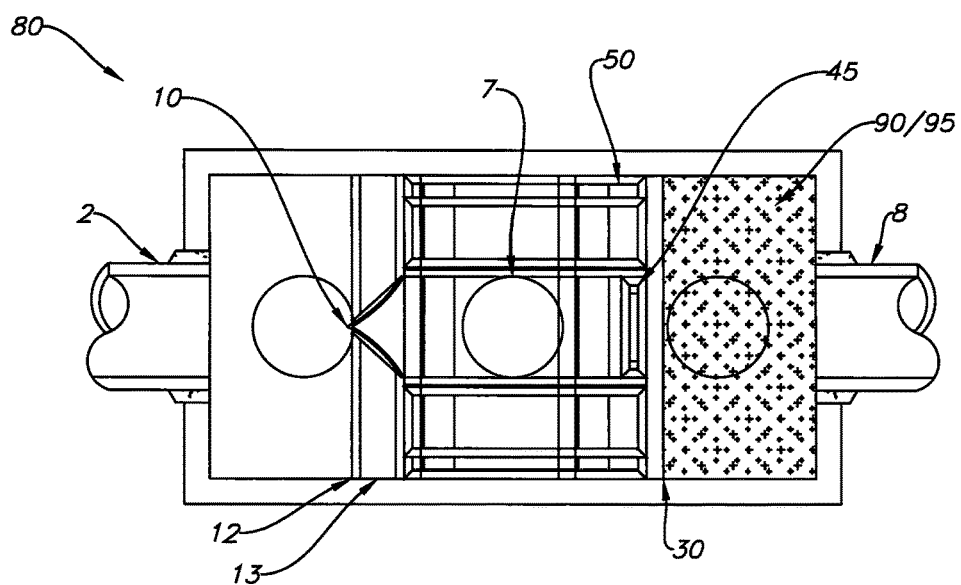

FIG. 13 is a top view of the box/vault system of FIG. 12 along arrow 13X.

Figure 14:
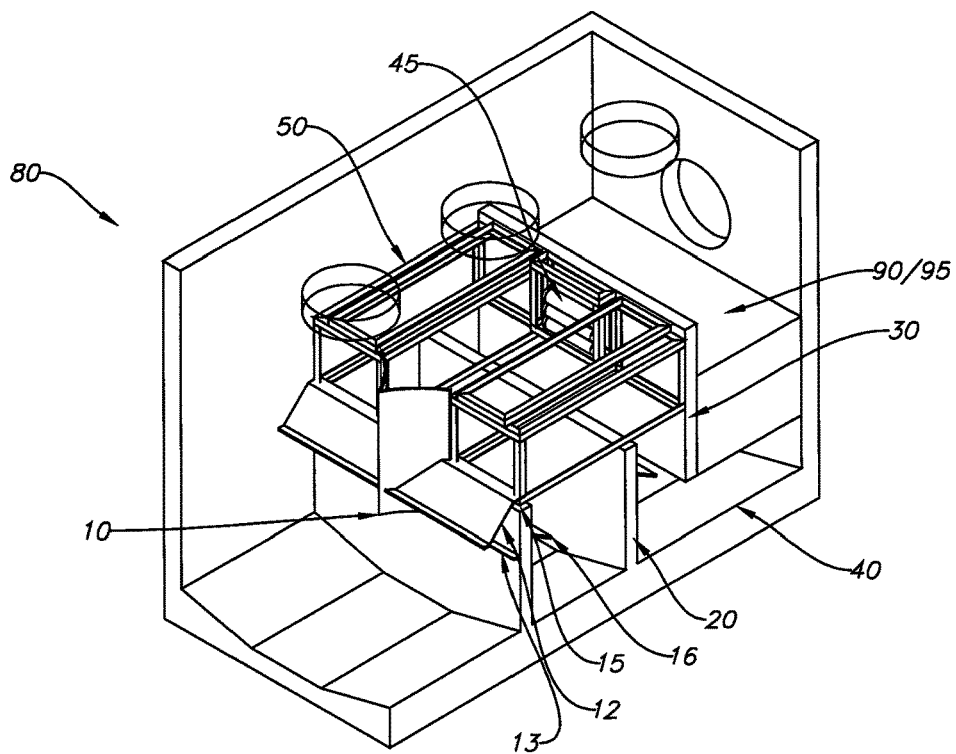

FIG. 14 is an upper front right perspective view of the box/vault system of FIG. 12.

Figure 15:
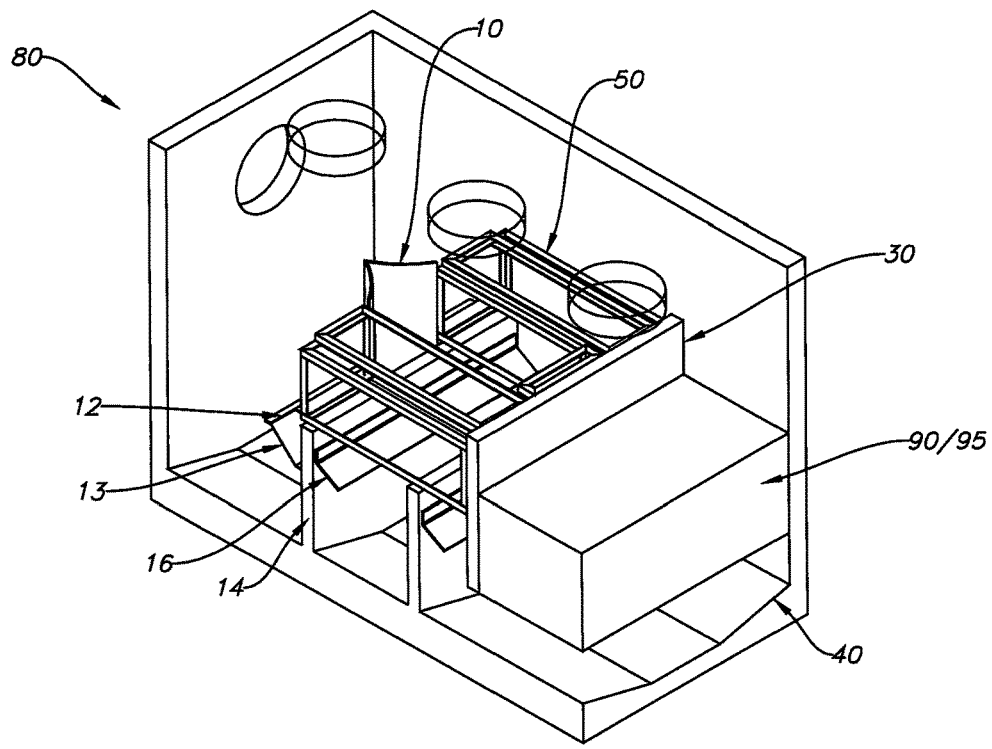

FIG. 15 is an upper rear left perspective view of the box/vault system of FIG. 12.

Third Embodiment, Includes First Embodiment with Hydroslide

Figure 16:
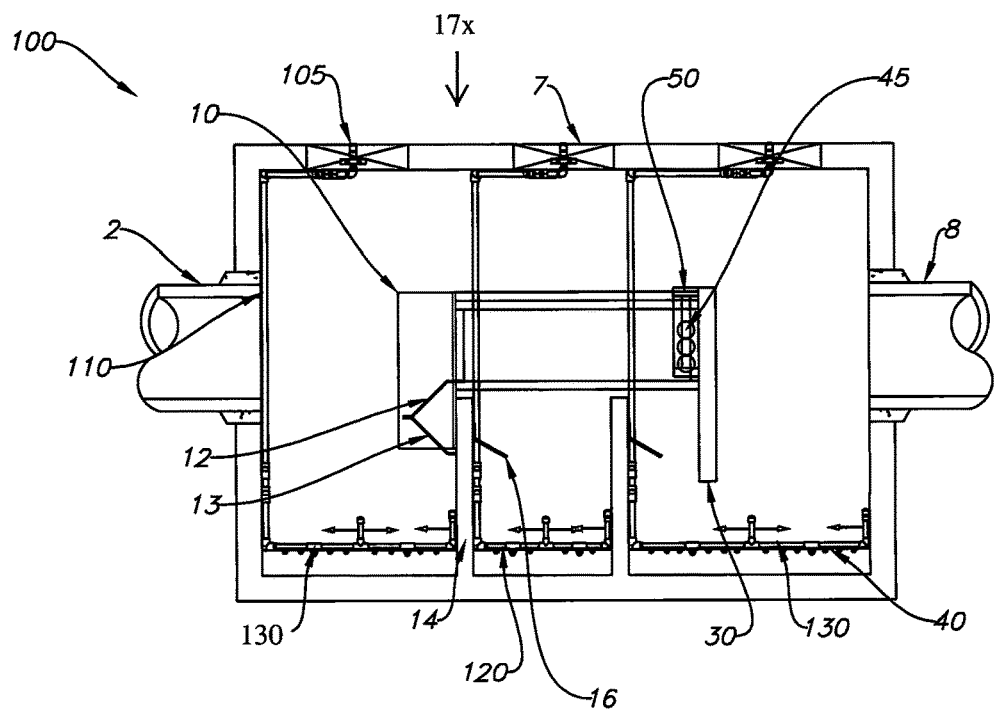

FIG. 16 is a side cross sectional view of a third embodiment dual vortex baffle box/vault system with flow spreader, debris ramp, screened deflector, dual screen systems, and hydroslide servicing system.

Figure 17:
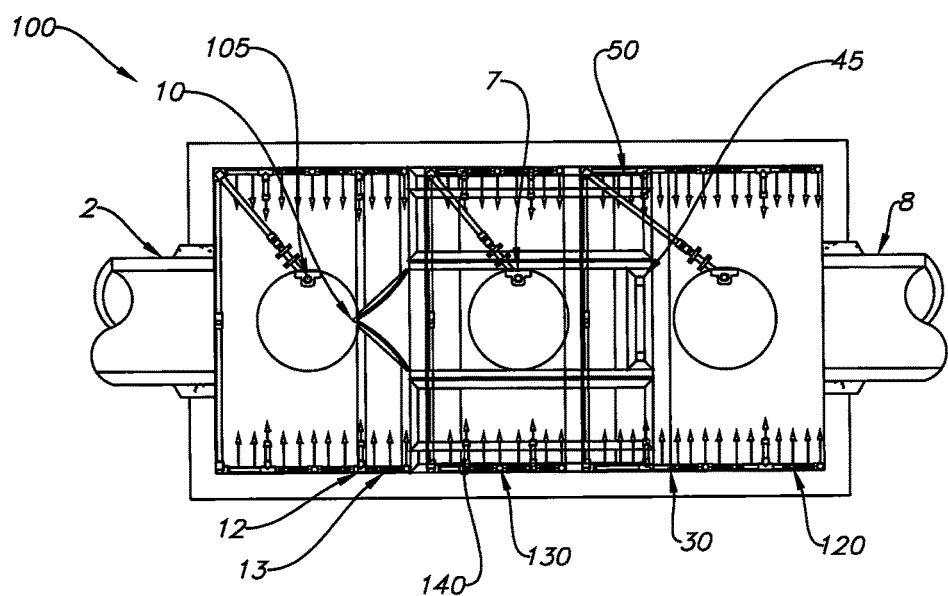

FIG. 17 is a top view of the box/vault system of FIG. 16 along arrow 17X.

Figure 18:
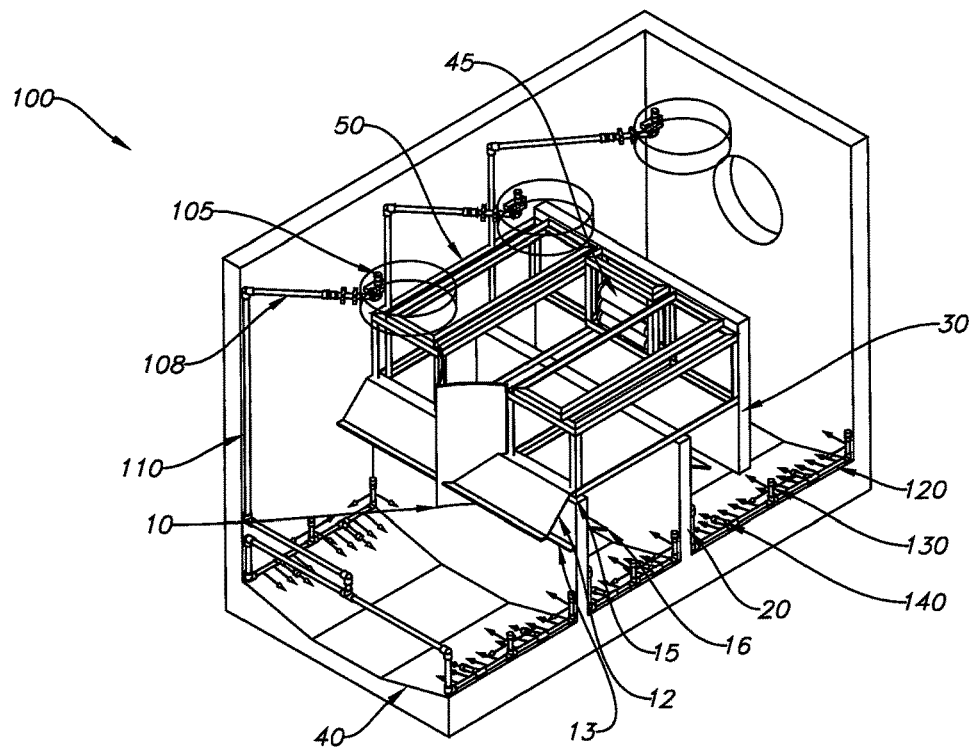

FIG. 18 is an upper front right perspective view of the box/vault system of FIG. 16.

Figure 18A:
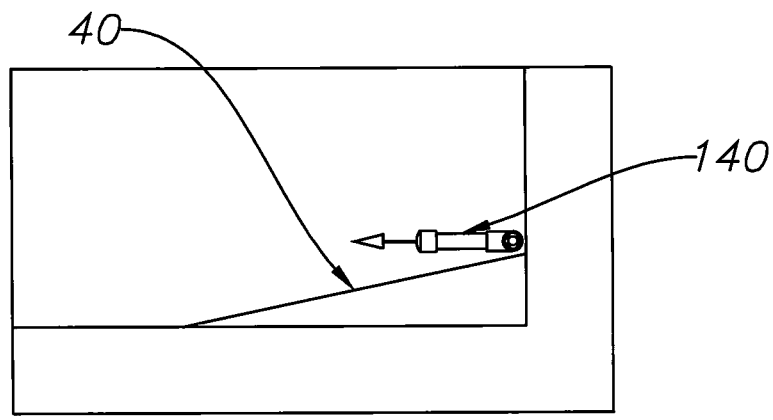

FIG. 18A is an enlarged view of a single spray lever in horizontal orientation.

Figure 18B:
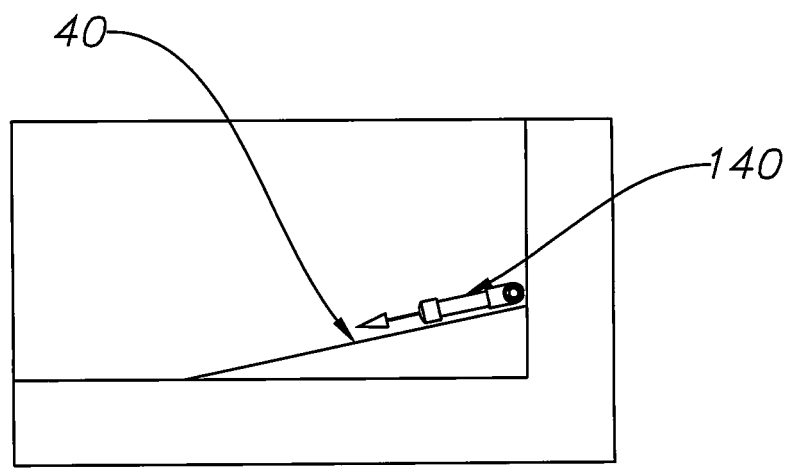

FIG. 18B is another view of the spray lever of FIG. 18A bent downward.

Figure 19:
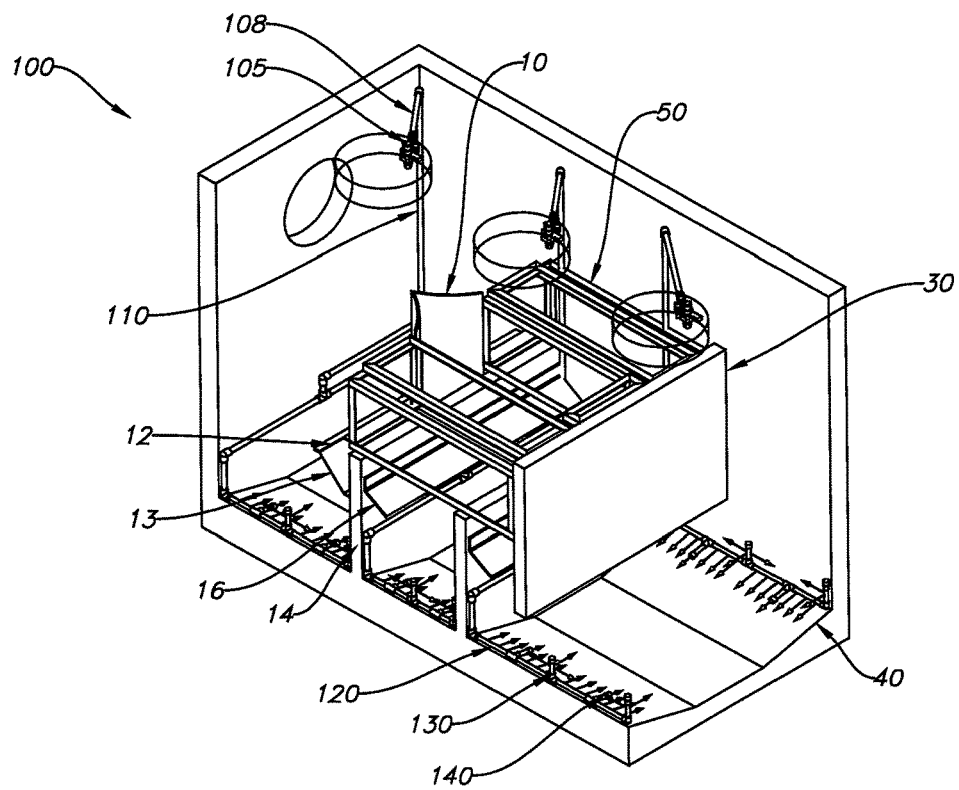

FIG. 19 is an upper rear left perspective view of the box/vault system of FIG. 16.

Figure 19A:
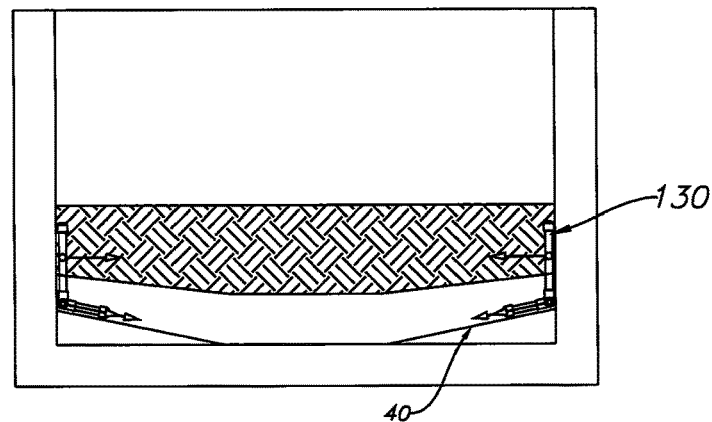
Figure 19B:
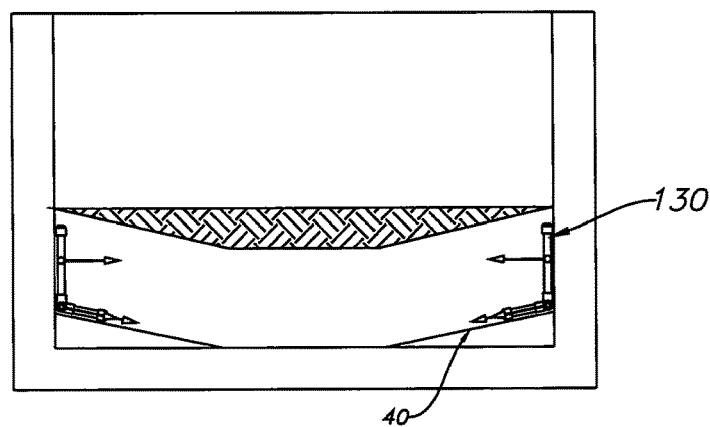
Figure 19C:
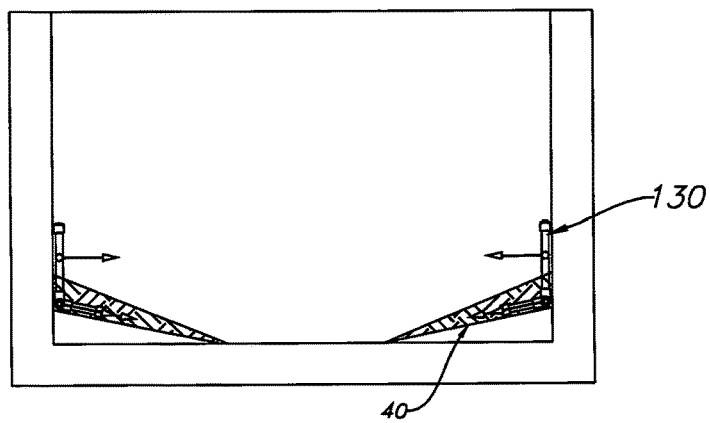

FIGS. 19A, 19B and 19C are side views of the box/vault system of FIG. 16 showing how the hydroslide knives and levers move the sediment.

Figure 19D:
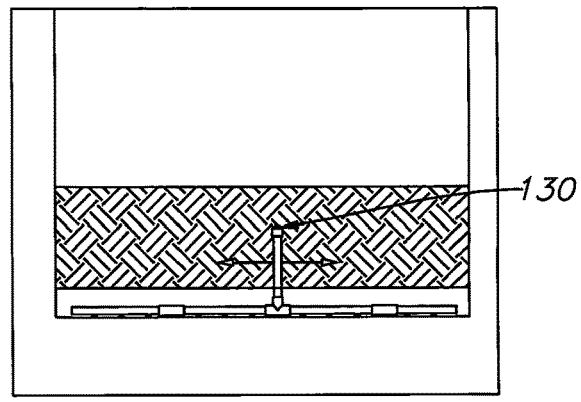
Figure 19E:
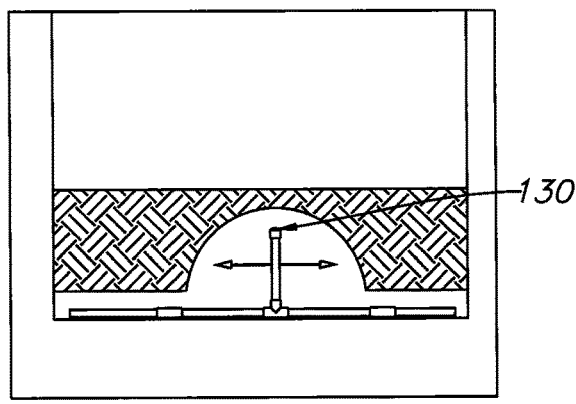
Figure 19F:
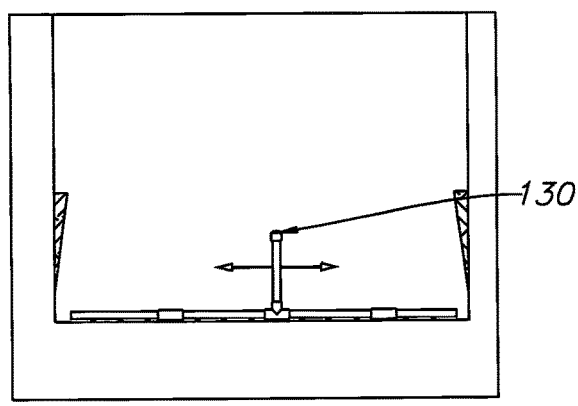

FIGS. 19D, 19E and 19F are side views of the box/vault system of FIG. 16 showing additional views how the hydroslide knives and levers move the sediment.

Fourth Includes First Embodiment with Hydroslide & Media

Figure 20:
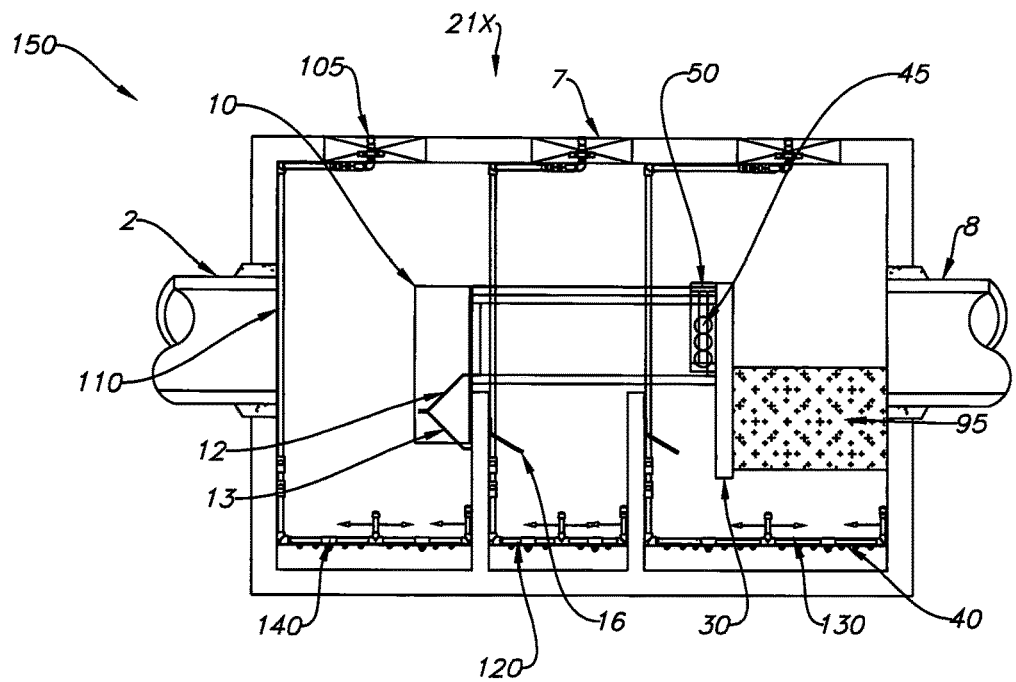

FIG. 20 is a side cross-sectional view of a fourth embodiment dual vortex baffle box/vault system with flow spreader, debris ramp, screened deflector, dual screened system, with hydroslide servicing system 100 and screened media vessel with media.

Figure 21:
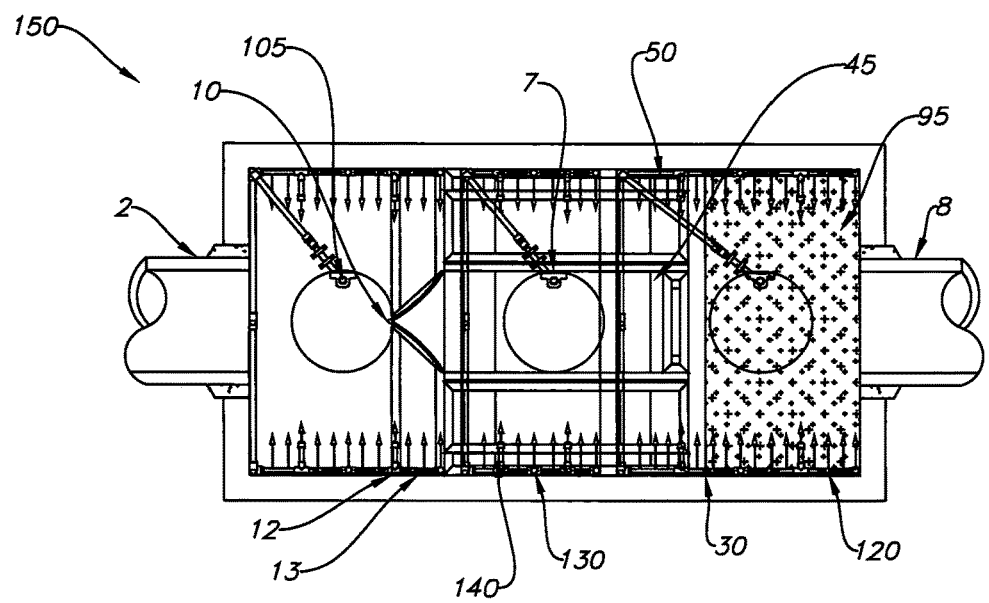

FIG. 21 is a top view of the box/vault system of FIG. 20 along arrow 21X.

Figure 22:
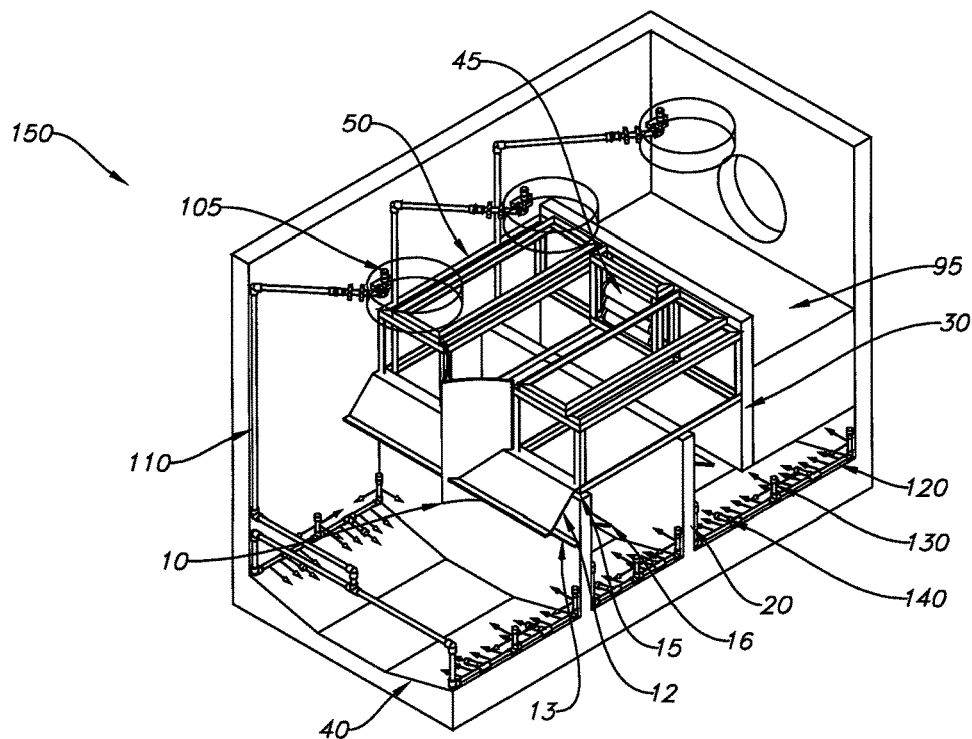

FIG. 22 is an upper front right perspective view of the box/vault system of FIG. 20.

Figure 23:
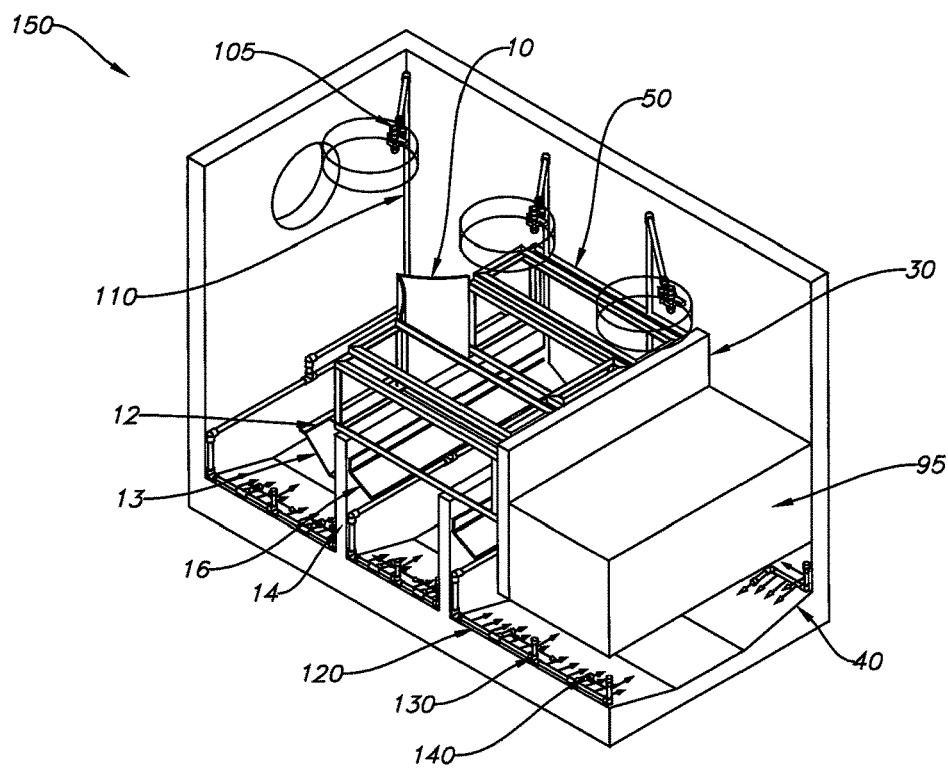

FIG. 23 is an upper rear left perspective view of the box/vault system of FIG. 20.

Fifth Embodiment Includes First Embodiment with Large Flow Spreader

Figure 24:
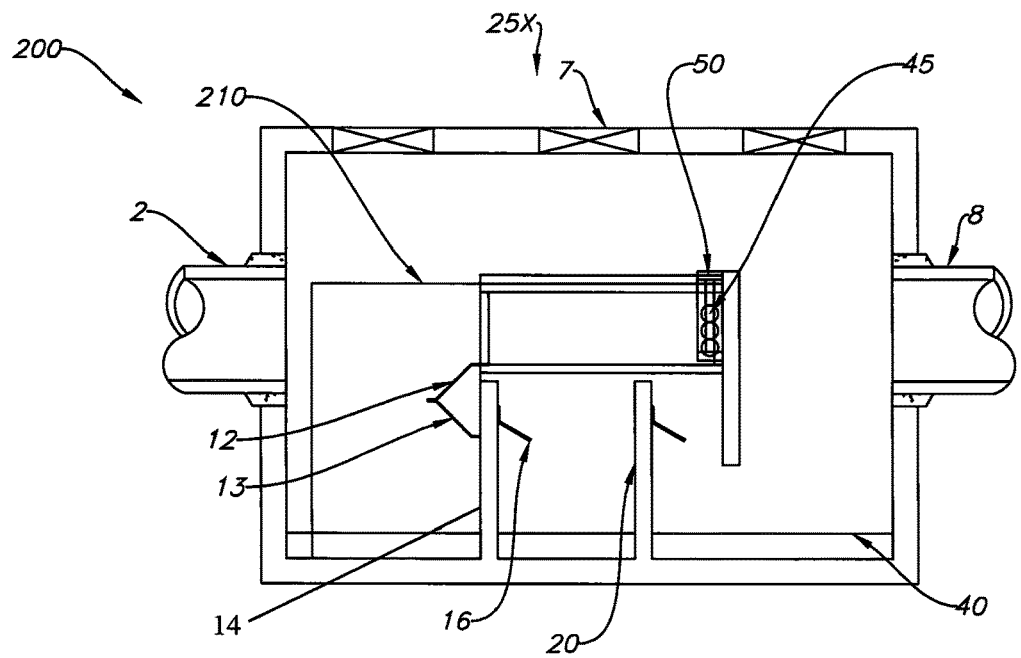

FIG. 24 is a side cross-sectional view of a fifth embodiment of a dual vortex baffle box/vault system with large flow spreader, screened deflector, and debris ramp.

Figure 25:
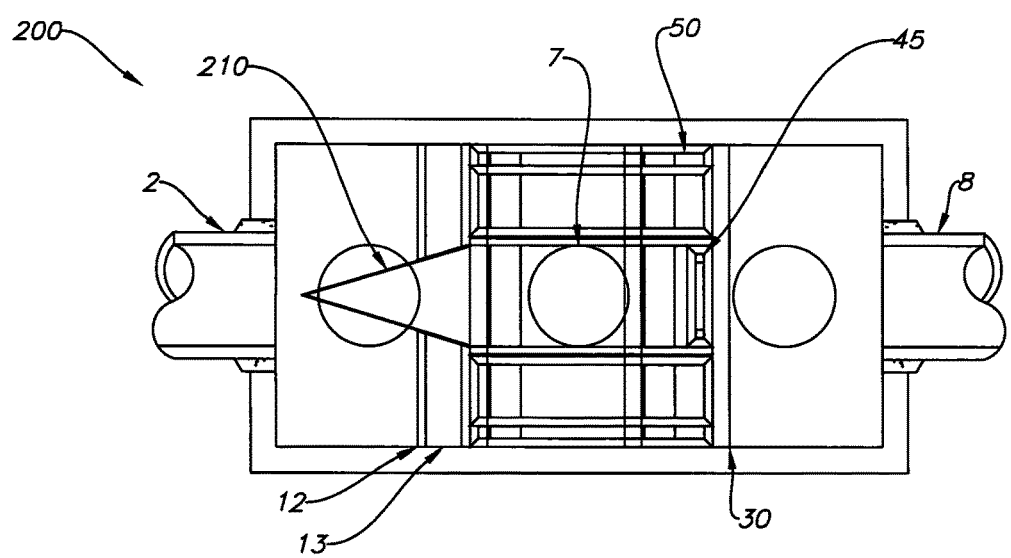

FIG. 25 is a top view of the box/vault system of FIG. 24 along arrow 25X.

Figure 26:
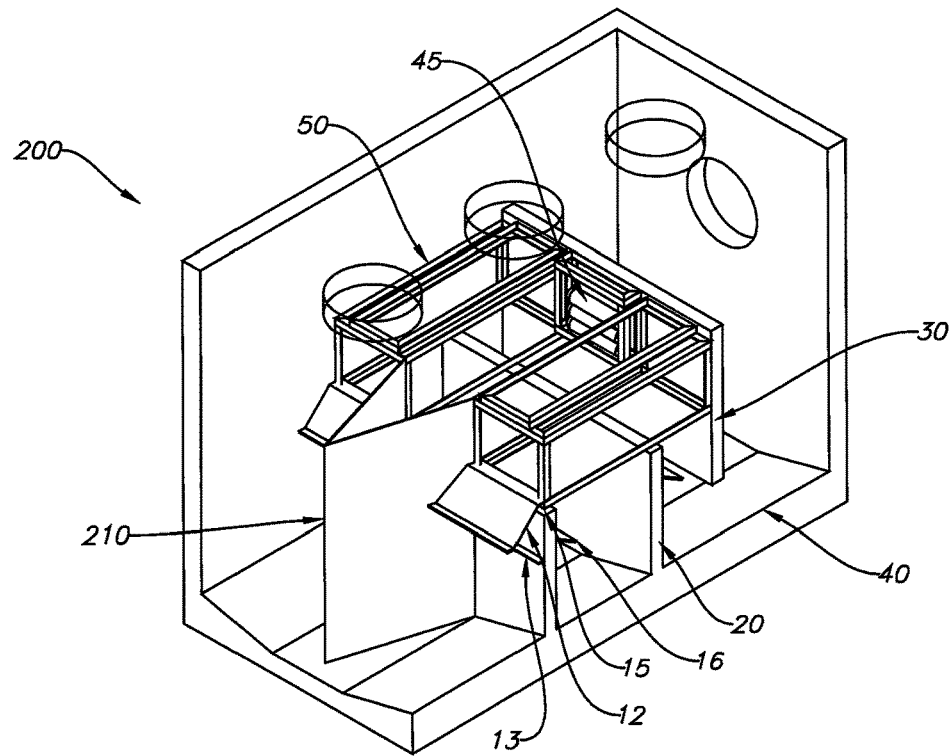

FIG. 26 is an upper front right perspective view of the box/vault system of FIG. 24.

Figure 27:
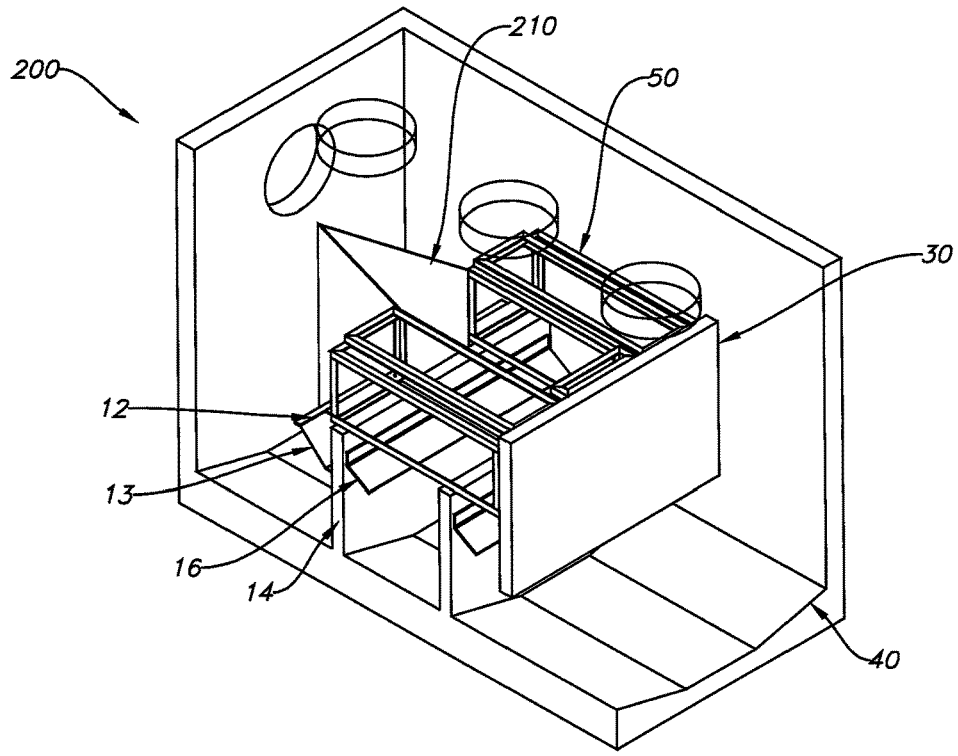

FIG. 27 is an upper rear right perspective view of the box/vault system of FIG. 24.

Figure 28:
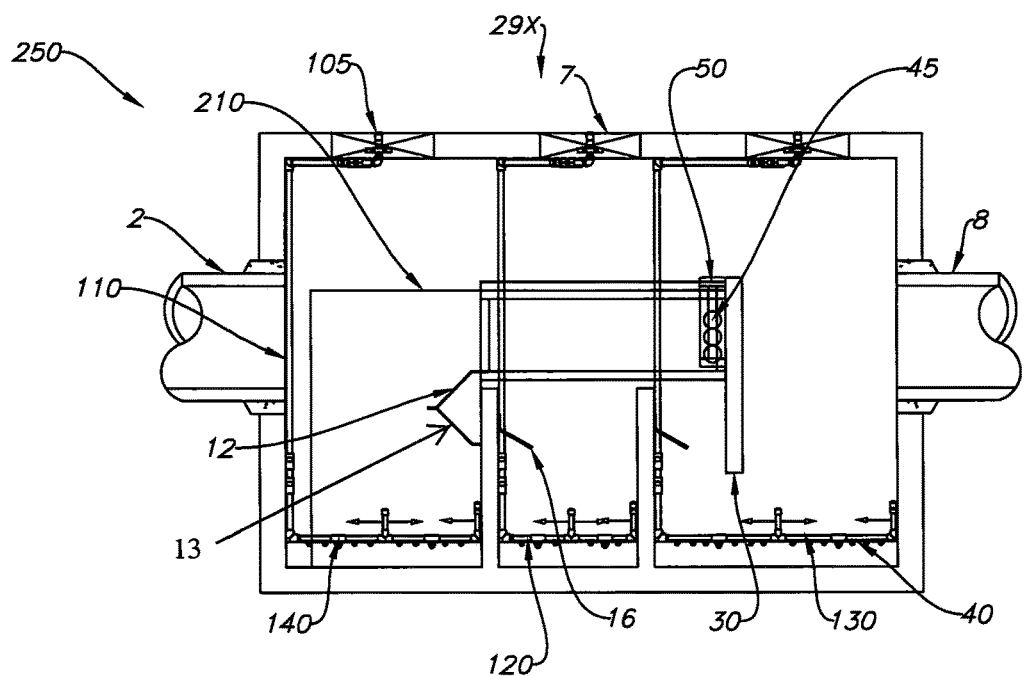

Sixth Embodiment Includes First Embodiment with Large Flow Spreader & Hydroslide FIG. 28 is a side cross-sectional view of a sixth embodiment of a dual vortex baffle box/vault system with large flow spreader, screened deflector, and debris ramp and hydroslide servicing system.

Figure 29:
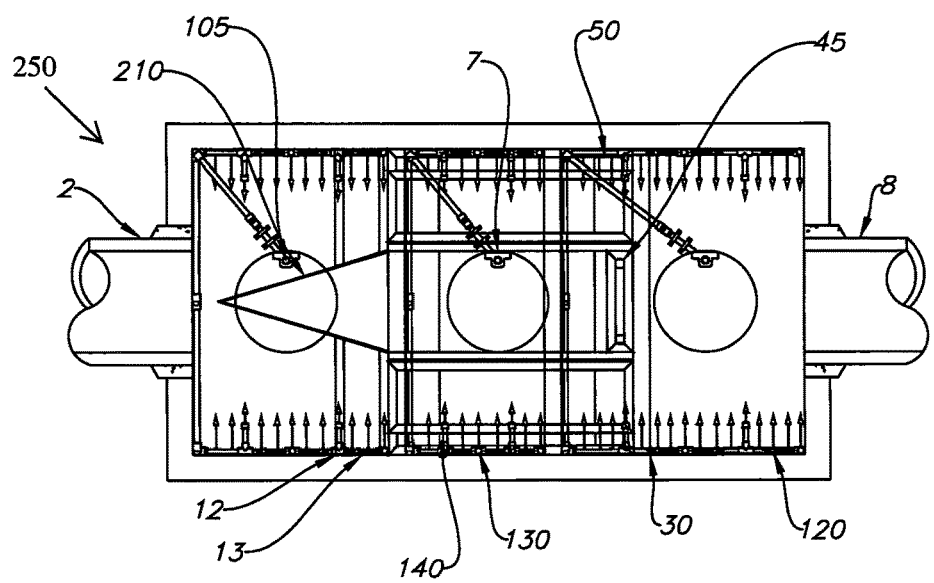

FIG. 29 is a top view of the box/vault system of FIG. 28 along arrow 29X.

Figure 30:
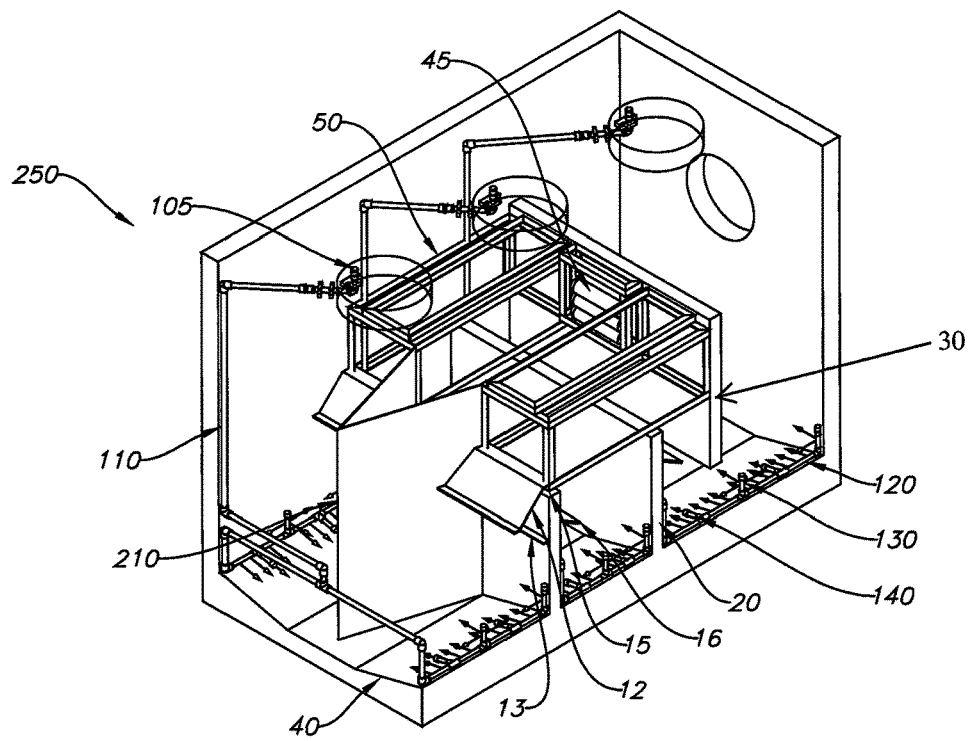

FIG. 30 is an upper front right perspective view of the box/vault system of FIG. 28.

Figure 31:
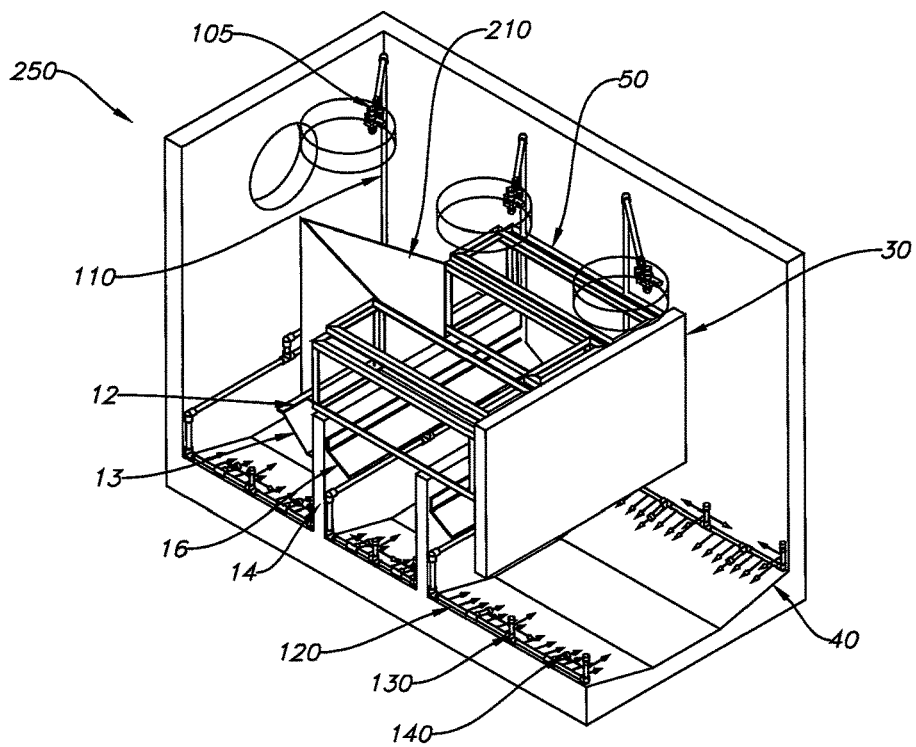

FIG. 31 is an upper rear left perspective view of the box/vault system of FIG. 28.

Seventh Embodiment Includes First Embodiment with Convex Large Flow Spreader

Figure 32:
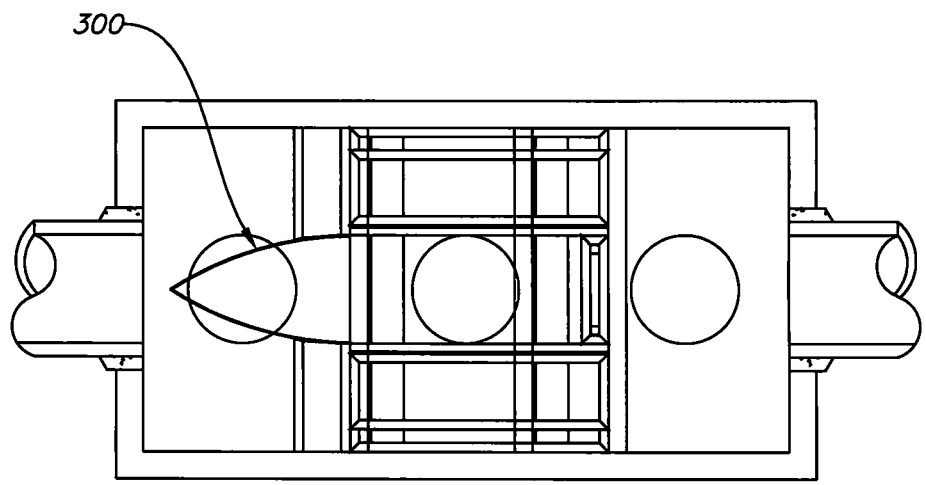

FIG. 32 is a top perspective view of a seventh embodiment of a dual vortex baffle box/vault system with large convex flow spreader, screened deflector, and debris ramp.

Eighth Embodiment Includes First Embodiment with Concave Large Flow Spreader

Figure 33:
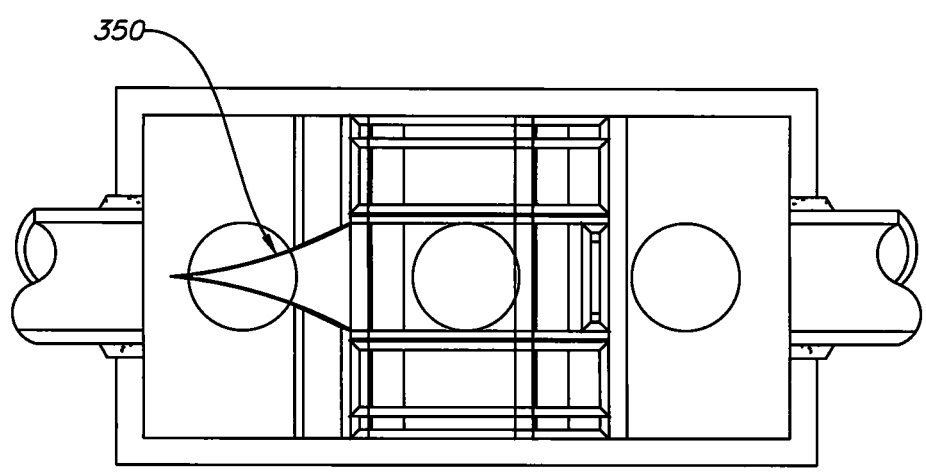

FIG. 33 is a top perspective view of a seventh embodiment of a dual vortex baffle box/vault system with large concave flow spreader, screened deflector, and debris ramp.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
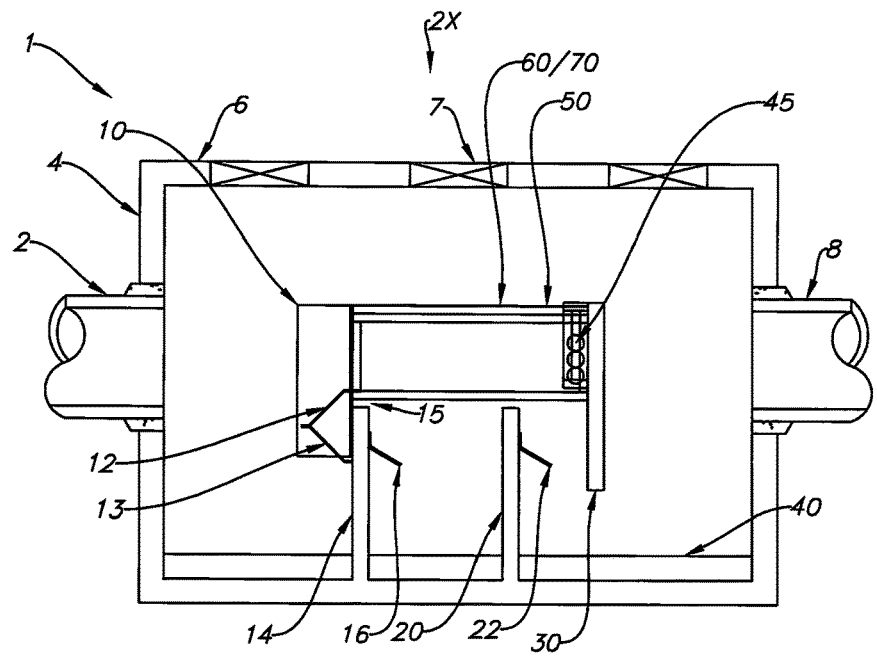
FIG. 1 is a side cross-sectional view of a first embodiment of a dual vortex baffle box/vault system with flow spreader, screened deflector and debris ramp.
Figure 2:
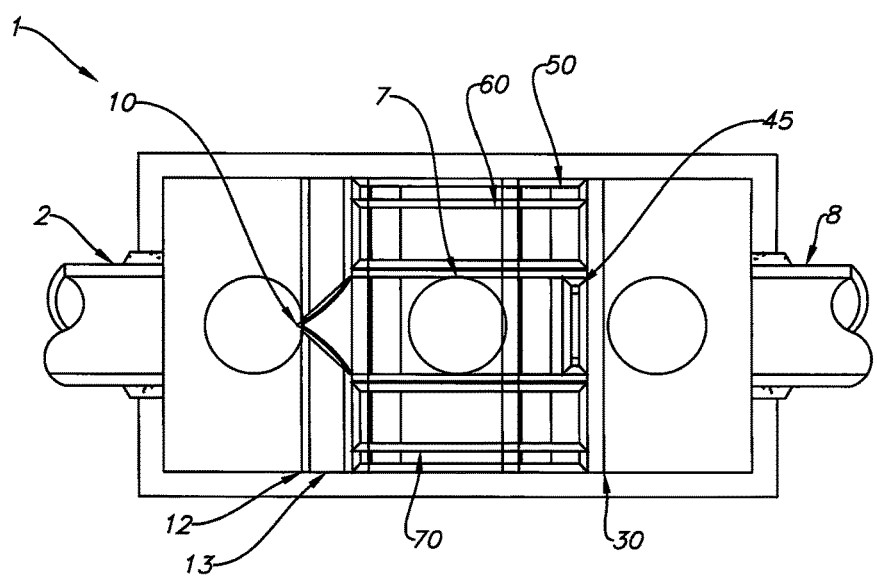
FIG. 2 is a top view of the box/vault system of FIG. 1 along arrow 2X.
Figure 3:
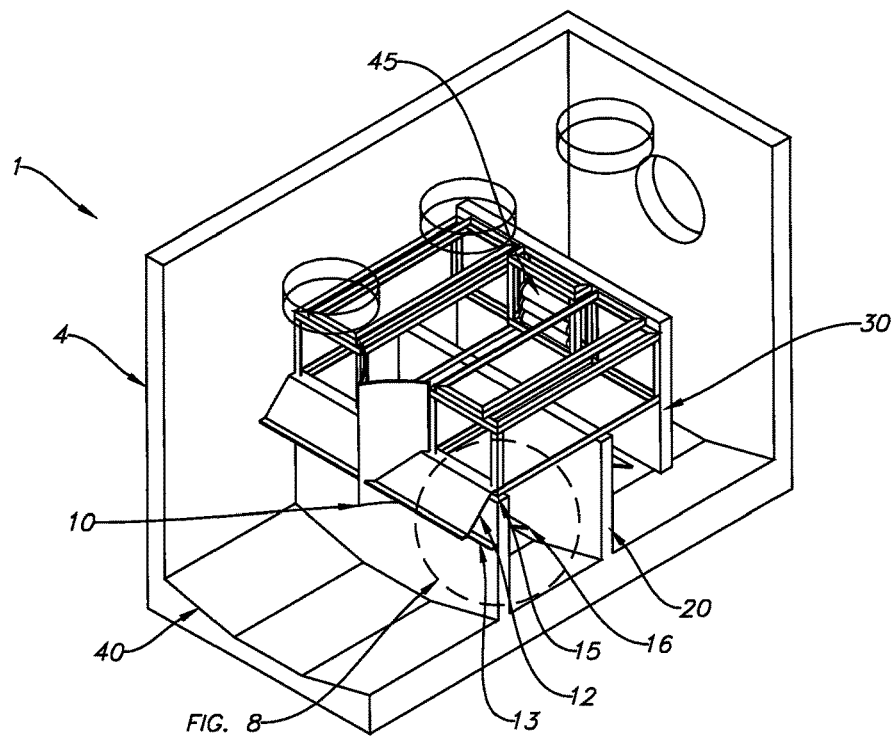
FIG. 3 is an upper front right perspective view of the box/vault system of FIG. 1.
Figure 4:
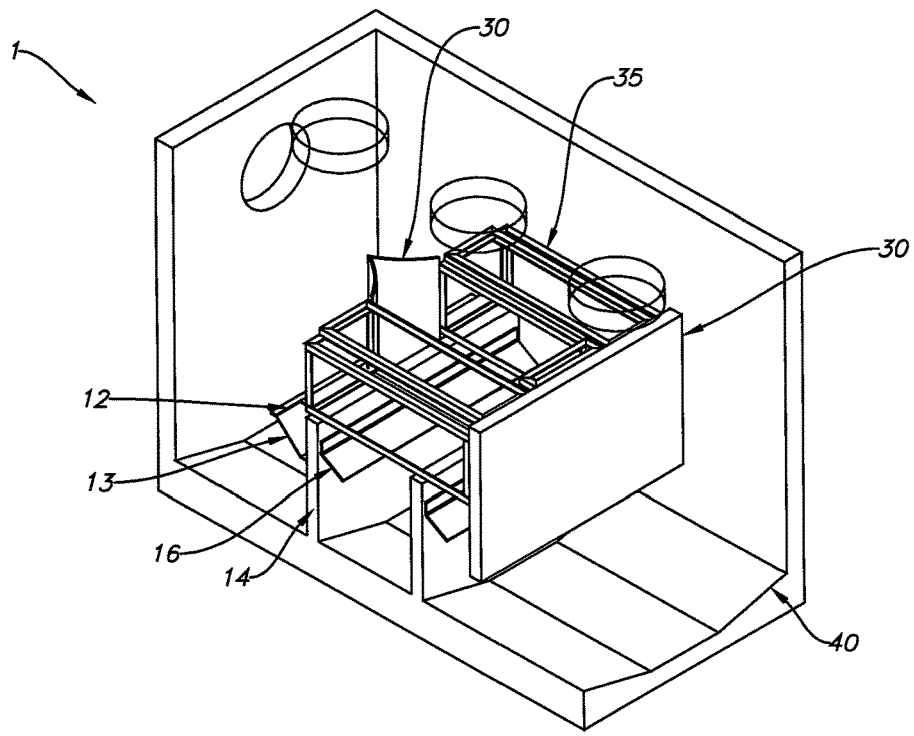
FIG. 4 is an upper rear left perspective view of the box/vault system of FIG. 1.

A list of components will now be described.
1 dual baffle vault/box/system with debris ramp and screened deflector, flow spreader,
2 inflow pipe/line
4 side walls of vault/box
6 top of vault/box
7 access point
8 outflow pipe/line
10 flow spreader V shape
12 debris ramp
13 screened deflector
14 first baffle
15 gap
16 baffle deflector on outlet side of first baffle
20 second baffle
22 deflector on second baffle on outlet side
30 skimmer baffle
40 sloped floor
45 oil boom(s)
47 oil boom cage
50 dual vortex baffle box/vault/system with screen systems and hinging lids
60 first (left side) hinged screen box
70 second (right side) hinged screen box
80 dual vortex baffle box/vault/system with debris ramp and screened deflector, flow spreader, screen systems, hinged lids and media vessel
90 media vessel
95 media
100 dual vortex baffle box/vault/system with debris ramp and screened deflector, flow spreader, screen systems, hinged lids and hydroslide servicing system
105 water connection(s)
108 upper horizontal water line(s)
110 vertical water line(s)
120 spray bar(s) along side floor corners
125 spray head(s)
130 spray knife/knive(s)
140 spray lever
150 dual vortex baffle box/vault/system with flow spreader and debris ramp and screened deflector and screen systems, hinged lids and hydroslide servicing system and media vessel with media
200 dual vortex box/vault/system with large flow spreader and debris ramp and screened deflector and screen systems.
210 large flow spreader.
250 dual vortex box/vault/system with large flow spreader and debris ramp and screened deflector and screen systems and hydroslide systems.
300 Convex Flow Spreader
350 Concave Flow Spreader First Embodiment Dual Vortex Baffle Box/Vault/System with Flow Spreader and Screened Deflector and Debris Ramp FIG. 1 is a side cross-sectional view of a first embodiment of a dual vortex baffle box/vault system 1 with flow spreader 10, screened deflector 13 and debris ramp 12. FIG. 2 is a top view of the box/vault system 1 of FIG. 1 along arrow 2X. FIG. 3 is an upper front right perspective view of the box/vault system 1 of FIG. 1. FIG. 4 is an upper rear left perspective view of the box/vault system 1 of FIG. 1.

Figure 5:
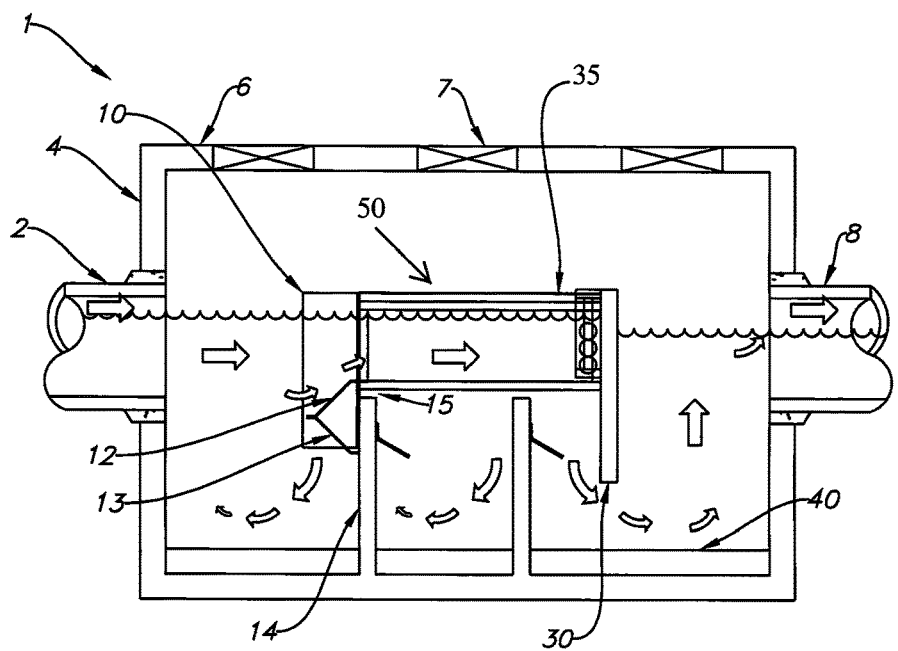
FIG. 5 is another right side cross-sectional view of FIG. 1 with low HGL water lines and flow arrows.
Figure 6:
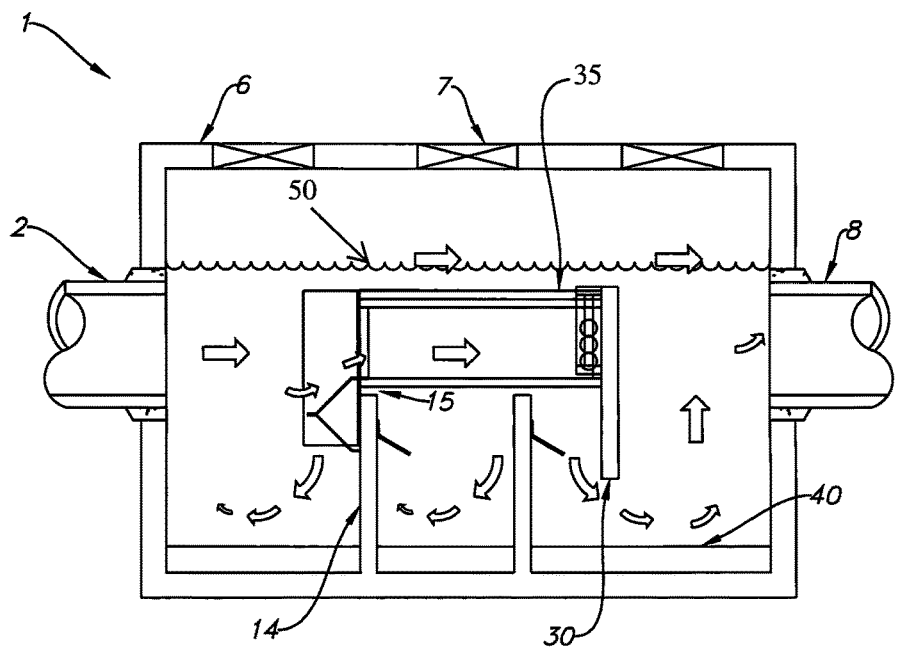
FIG. 6 is another right side cross-sectional view of FIG. 1 with high HGL water lines and flow arrows.

FIG. 5 is another right side cross-sectional view of the system 1 of FIG. 1 with low HGL water lines and flow arrows. FIG. 6 is another right side cross-sectional view of the system 1 of FIG. 1 with high HGL water lines and flow arrows.

Figure 7:
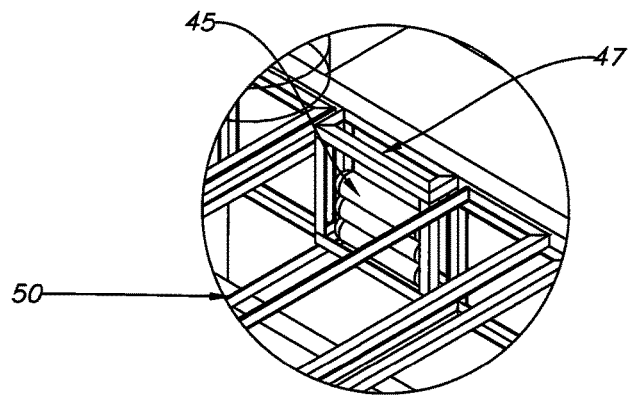
FIG. 7 is an enlarged view of the oil booms in oil boom cage used in the box/vault system of FIG. 1.

FIG. 7 is an enlarged view of the oil booms 45 in oil boom cage 47 used in the box/vault system 1 of FIG. 1.

Figure 8B:
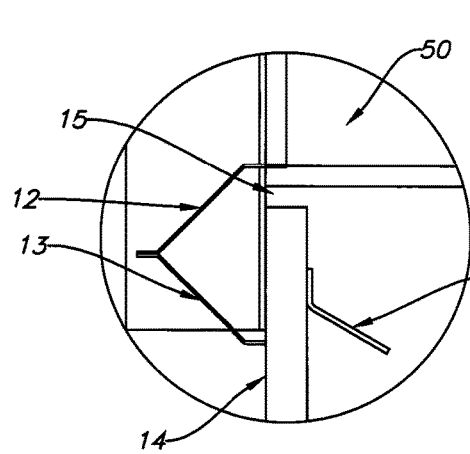
FIG. 8B is a side view of the debris ramp and screened deflector of FIG. 8A.
Figure 8C:
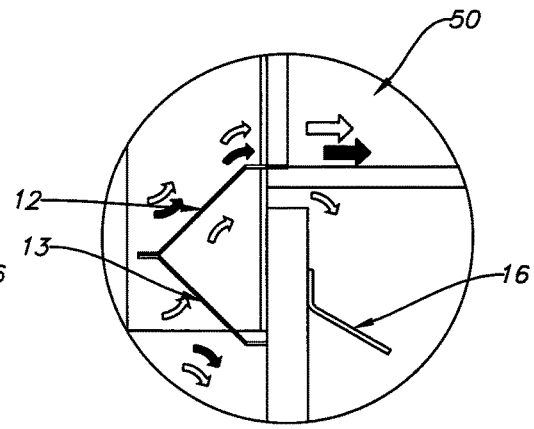
FIG. 8C is another view of the debris ramp and screened deflector of FIG. 8B with flow arrows.
Figure 8A:
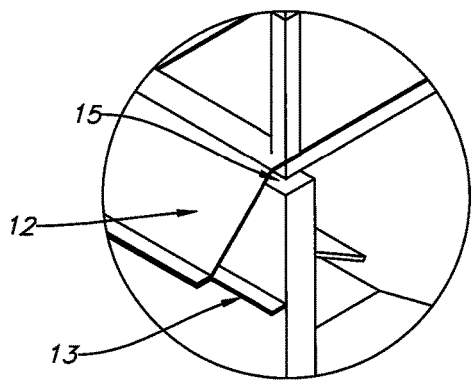
FIG. 8A is an enlarged view of the debris ramp and screened deflector of FIG. 3.

FIG. 8A is an enlarged view of the debris ramp 12 and screened deflector 13 of FIG. 3. FIG. 8B is a side view of the debris ramp 12 and screened deflector 13 of FIG. 8A. FIG. 8C is another view of the debris ramp 12 and screened deflector 13 of FIG. 8B with flow arrows.

Referring to FIGS. 1-8C, the dual vortex baffle box/vault system 1 can include an inflow pipe/line 2 which allows for water flow into the chamber/box/vault that has side walls 4 in a box shape over a sloped floor 40, and a top 6 having access points 7, with an outlet flow pipe/line 8.

A dual screen system 50 comprising a first (left side) screen box 60 and second (right side) screen box 70 can be supported on top of baffles 14 and 20.

Screen systems 50, 60, 70 can be formed similar to screen systems shown and described in U.S. Pat. No. 8,491,797 to Happel, which is incorporated by reference in its' entirety. The openings in the screens can range from approximately ⅛ of an inch to approximately 2 inches in diameter, and be either uniform diameters or combinations of different diameters as needed.

In front of the dual screen system 50 can be a flow spreader 10 having a height similar to the height of the dual screen system 50 and a bottom raised above the sloped floor 40. Along both sides of the flow spreader 50 can be an angled debris ramp 12 having a lower forward end spaced in front of the baffle 14 and rear upper end adjacent to the floor surface of each of the first (left side) screen box 60 and second (right side) screen box 70. Beneath the debris ramp 12 can be a downwardly angled screened deflector 13. The screened deflector 13 can have an upper forward end which forms a lip with the lower forward end of the debris ramp 12, and a rear lower end against the first baffle 14.

Between the top of first baffle 14 and the bottom of each of the first (left side) screen box 60 and second (right side) screen box 70 can be gap 15.

On a rear side of the first baffle 14 can be a deflector 16, and on a rear side of the second baffle 20 can be a deflector 22. Adjacent a rear end of each of the first (left side) screen box 60 and second (right side) screen box 70 can be a baffle skimmer 30. Against the inner wall of the baffle skimmer 30 between the rear ends of the first (left side) screen box 60 and second (right side) screen box 70, can be an oil boom cage 47 with oil booms 45 therein.

The oil booms 45 can include polymer treatment systems, such as those described in applicants parent U.S. patent application Ser. No. 15/686,931 filed Aug. 25, 2017 to Happel, which is incorporated by reference in its' entirety.

The flow spreader 10 and deflectors 16, 22 can also be similar to those shown and described in U.S. Pat. No. 8,142,666 to Happel, which is incorporated by reference in its' entirety.

Both the bottom ends of the first baffle 14 and the second baffle 20 can be directly mounted to the sloped floor 40 forming closed chambers between the inlet wall and the first baffle 14, and between the first baffle 14 and the second baffle 20.

Settling Chambers:

Referring to FIGS. 1-8C, the stormwater treatment system can include a vault with side walls 4 above a sloped floor 40 with top 6 having access points 7 having an inflow opening 2 and outflow opening 8. Below the elevation of the inflow opening 2 and outflow opening 8, and positioned below the flow line between the inflow opening 2, and outflow opening 8 can be two or more settling zones or settling chambers.

The system 1 can have one or more baffles 16, 20 that span the width of the treatment vault. These baffles 16, 20 can divide the setting zone of the treatment system into distinct separate debris settling zones or chambers. The flow spreader 10 will be positioned within and above the first chamber. As stormwater flow enters the treatment system 1, the inflow opening 2 is above and adjacent to what will be described as the first chamber or setting zone. the second settling chamber. A baffle wall 14 that spans the width of the treatment vault can comprise the downstream side of the first settling chamber. This baffle wall 14 can also comprise the upstream side of a second settling chamber. With just one baffle wall 14 in position, the second chamber will have an upstream side wall defined by the downstream side of the baffle 14, the side walls 4 of the treatment vault, and the outflow end wall of the treatment vault.

If a second baffle 20 is inserted into the invention the two baffles 14, 20 will combine to form three distinct settling chambers. With the invention having 2 baffles, the second chamber is defined by the downstream side of the first baffle 14, the side walls 4 of the treatment vault, and the upstream side of the second baffle 20, and the third settling chamber is defined by the downstream side of the second baffle 20, the two side walls 4 of the treatment vault, and the outflow end adjacent to the outlet pipe/line 8 of the treatment vault.

As stormwater flow enters the stormwater treatment vault, the flow will spread wide within the vault and the linear velocity of the water flow will decrease. The cross-sectional area of the vault is significantly greater than that of the inflowing stormwater conveyance. The result of stormwater flow entering the vault is that the water flow will spread wide to approximately the width of the vault. A result of the water flow spreading wide within the treatment vault is that the linear velocity of the water flow is significantly reduced. Slowing the water velocity within the treatment vault will act to calm and reduce turbulence.

Gravity will act on solids entering the treatment vault such that the heavier than water solids will settle into the lower settling zone or zones. The settling zone or settling chamber of the treatment vault can be divided into separate zones or chambers by incorporating baffles 14, 20 that span the width of the treatment vault. Having multiple settling chambers can effectively increase the storage volume for captured debris. As debris settles below the flow line between the inflow and the outflow, and or below the tops of the baffles the turbulence of the water is reduce. The further the debris settles the more the turbulence is reduced. Typically, the depth of these settling chambers is such that debris has settled to a depth that is an adequate distance below the tops of the baffles such that debris will not re-suspend during high flow rain events. The settled debris is adequately separated from the turbulence between the inflow and outflow openings for the debris to not be able to scour and escape the treatment system 1.

Turbulence Deflectors:

Referring to FIGS. 1-8C, turbulence deflectors 12, 13 can be added to the invention so that the settling chambers can be more effectively isolated from the turbulence of the water flow. These deflectors 12, 13 are typically either generally horizontal or angles and they extend away from a baffle 14 toward the center of a settling chamber between the first baffle and the inlet. The turbulence deflectors are generally rigid and can be made from many common materials such as, but not limited to, fiberglass, plastic, aluminum, steel, stainless steel, or any other type of generally rigid material. The deflector 12 can have either a solid or screened surface. The deflector 13 generally includes a screened surface. As previously discussed, the flow spreader 10 can have either a screened or solid surface. The deflectors 12, 13 are limited size such that they do not interfere with the access of a servicing vacuum line from being able to reach the floor of a settling chambers to remove debris that has settled.

In the first settling chamber a deflector 12, that also serves as a debris ramp 12 to facilitate debris entering the debris separating screen systems 50, 60, 70, can be positioned adjacent to the bottom of the opening of the dual screen systems 50, 60, 70. This deflector 12 is generally angled downward from the inflow into the screen systems 50, 60, 70 and will serve to both reduce turbulence in the first chamber, and direct debris into the bodies of the debris separating screen systems 50, 60, 70. This deflector 12 will be positioned such that it fits between the flow spreader 10 and each sidewall 4 of the treatment vault, which will serve to direct debris into the screen systems 50, 60, 70. The deflector 13 can be attached, but not limited to, the screen system, to the baffle 14 below the screen system 50, 60, 70, to the side wall 4 of the treatment vault, to the flow spreader 10, or any combination of the before mentioned attachment locations.

In the second settling chamber a deflector 16 can be positioned adjacent to the top of the downstream side of the first baffle 14. This turbulence deflectors 12, 13 will serve to reduce turbulence by creating a back pressure within the settling chamber. As turbulence or water flow enter the second chamber the position of this deflector 16 will energy of the water flow will decrease, and debris will be able to settle.

If a second baffle 20 is added and there are 3 distinct settling chambers, a deflector 22 can be positioned adjacent to the top of the downstream side of the second baffle 20. This turbulence deflector 22 will serve to function similar to that of the deflector 16 in the second chamber.

The debris ramp 12 is intended to direct floatables into the dual screen systems 50, 60, 70. Although the debris ramp 12 and screened deflector 13 appear to have straight and angled, the ramp 12 and screened deflector 13 can have different surface shapes, such as but not limited to convex and concave. Also, the ramp 12 and deflector can be horizontal, vertical and the like.

Flow Spreader and Debris Capture Screen System:

Referring to FIGS. 1-8C, as water flow enters the treatment system 1 a flow spreader 10 can be positioned adjacent to the inflow opening 2 such that the flow spreader 10 can act to assist with spreading the water flow wide within the treatment vault. The flow spreader 10 can be generally V shaped and attached to the upstream side of a baffle 14 that spans the width of the treatment system. Floating debris, such as litter and foliage that enter the treatment system 1 can be directed by the flow spreader 10 toward dual debris capture screen systems 60, 70 located adjacent to each side 4 of the treatment vault.

The debris capture screen systems 50, 60, 70 can be positioned above the top of the baffle 14 or baffles 14, 20, and adjacent to each side wall 4 of the treatment vault. As floating debris enters the stormwater treatment vault the flow spreader 10 can direct the water flow wide along with the floating debris, and the floating debris will enter the body of the debris capture screen system where the debris will remain until the treatment vault is serviced.

Figure 9:
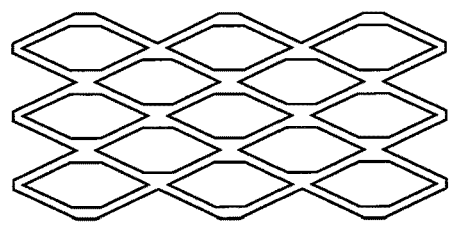
FIG. 9 is an enlarged partial view of the screened deflector of the preceding figures with a flattened expanded screen.
Figure 10:
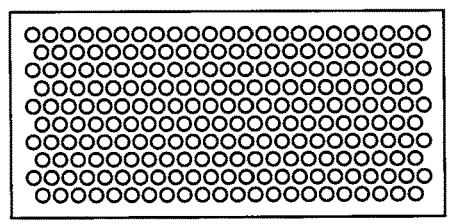
FIG. 10 is a front view of another screened deflector of the preceding figures with perforated screening.
Figure 11A:
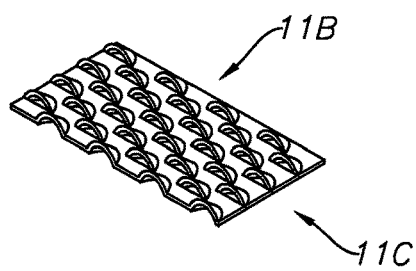
FIG. 11A is a partial perspective view of another screened deflector of the preceding figures with a louver expanded screen.
Figure 11B:
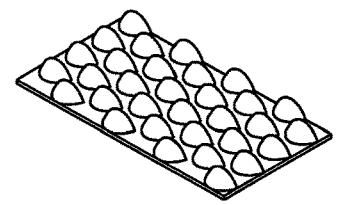
FIG. 11B is another perspective view of the louver expanded screen of FIG. 11A along arrow 11B.
Figure 11C:
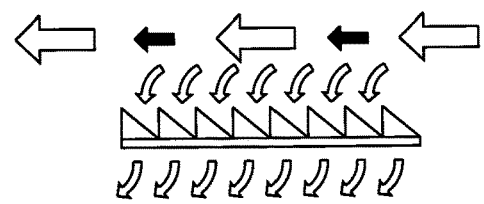
FIG. 11C is a cross-sectional view of the louver expanded screen of FIG. 11A along arrow 11C.

Referring to FIGS. 1-8C, the flow spreader 10 can have a solid surface, a perforated surface, or a screened surface. The solid surface material from which the flow spreader 10 is made, but not limited to, can be fiberglass, aluminum, plastic, concrete, or stainless steel. The types of screen material from which the flow spreader 10 can be made, but not limited to, are fiberglass, aluminum, plastic, or stainless steel. Some types of screens that can be utilized to make the flow spreader 10, but not limited to, can be an expanded screen (FIG. 9), perforated screen (FIG. 10), wire screen, bar screen, louvered screen FIGS. 11A, 11B and 11C), or louvered expanded screen. In FIG. 11C, the solid lines represent the flow direction of floatables and debris, while the other arrows represent the direction of water flow.

Utilizing a flow spreader 10 made with a surface of screen has the advantage of being making more screen area available to avoid the potential for the screens becoming fully blinded. In addition, the water flow entering the treatment vault has adequate velocity to push debris off of the flow spreader 10, which prevents debris from accumulating on a screened flow spreader 10.

The use of louvered expanded screen can be especially effective with passing water without the potential for debris to blind the screen. The shape of the louvers is such that when water flows across the screen surface, solids are deflected over the hole in the screen toward the next hole where it is deflected again. The solids are repeatedly deflected downstream beyond each hole until they have entered the debris capture screen system or settled into the settling chambers of the treatment system. This louvered screen is highly effective and resistant to being blinded.

Another advantage gained by using a flow spreader 10 with a screened surface is the hydraulic pressure that is pressing solids against the screen in the debris capture systems is reduced. A common problem with debris and the screen systems that capture debris is the if the hydraulic pressure pressing the captured debris is adequately high enough, the captured debris can become jammed into the openings of the screen such that the screen becomes blinded and passes little to no water flow. In addition, once the captured debris is adequately jammed into the holes of a screen, the debris will not easily release from the screen after the rain event is over and the hgl recedes within the treatment system. The screens can become blinded without the volume of the screen system becoming close to full. Blinded screens within a treatment system will typically reduce the removal efficiency of pollutants of concern.

The debris capture screen system 50, 60, 70 can be made using any of the same types of materials and screen types that can be utilized to make the flow spreader 10. Although the debris capture screen systems 50, 60, 70 do not require screened lids, screen lids can be added. These added screened lids can be hinged such that access to the captured debris by a vacuum service truck can be more easily accomplished.

First Chamber Deflector and Debris Ramp:

Referring to FIGS. 1-8C, located behind in the first chamber, and between the screen system 50, 60, 70 and top of the baffle is an opening 15 which can potentially pass debris. To prevent the conveyance of debris through this opening 15, and to prevent floating debris from collecting under the debris ramp, a screened barrier 13 can be added to the invention. This screened barrier 13 can be such that it will add potential screened water conveyance through invention.

The shape and position of this screened barrier 13 can be such that it will be angled downward from the upstream edge of the first chamber deflector 12 and seal off against the baffle wall 14 and flow spreader 10. At this position the screened barrier 13 can have debris that can accumulate on the surface of the screen 13, pushed off by water flow that is moving along the surface of the flow spreader 10. The water flow will effectively clean the barrier screen 13 and prevent the barrier from becoming blinded by debris. Because the screened deflector 13 is angled adequately and attached to the upstream edge of the debris ramp 12, floating debris will not be able to accumulate under the debris ramp 12. In FIG. 8C, the solid arrows show the direction or solids passing over the ramp 12 and/or settling downward. The other arrows show the flow of water.

The debris ramp 12 is intended to direct floatables into the dual screen systems 50, 60, 70. Although the debris ramp 12 and screened deflector 13 appear to have straight and angled, the ramp 12 and screened deflector 13 can have different surface shapes, such as but not limited to convex and concave. Also, the ramp 12 and deflector 13 can be horizontal, vertical and the like. As previously described, the debris ramp can have a solid surface or include openings, such as screened openings and the like.

Skimmer:

Referring to FIGS. 1-8C, a skimmer 30 can be included in the invention to aid with preventing the conveyance of pollutants. The skimmer 30 can be positioned between the debris capture screen systems 50, 60, 70 and the outflow opening 8 of the treatment vault. The skimmer 30 can span the width of the treatment vault.

Filtration media that is primarily specific to the capture of hydrocarbons can be utilized by positioning this media between the dual debris capture screen systems 50, 60, 70 and upstream from the skimmer 30. Hydrocarbon media can be placed inside of sleeves of fabric or netting to make booms 45. Then these booms 45 can then floated in front of the skimmer 30 or be placed inside of a cage 47 or containment screen to keep them in place. When servicing the treatment system these hydrocarbon booms 45 can be replaced.

Bypass Conveyance within the Invention:

Referring to FIGS. 1-8C, being able to provide treatment for stormwater typically results with slowing water flow. Slowing the water flow creates a creates a physical constraint of the water flow that is commonly referred to as headloss. A treatment system 1 that creates too much headloss has the potential to cause flooding upstream. Generally, the faster the flow volume the greater potential for headloss. The invention has what has what is referred to as internal bypass, which mean bypass within the treatment system.

Referring to FIGS. 5-6, the sizing of the specialized internal components of the treatment system is such that, if for any reason the hgl in the treatment system 1 reaches a predetermined elevation within the treatment system, the water flow can bypass all the specialized interior components. Because the width of the treatment vault is significantly greater than that of the inflow or outflow pipes, the potential flow above the specialized interior components is adequate to convey the maximum conveyance of the inflow and outflow pipes with minimal increase in the hgl above the interior components. Most rain events do not produce stormwater flows that produce an hgl that can top the interior components of the invention. There are four primary scenarios in which the stormwater flow may need to bypass the specialized interior components. The four scenarios are listed below:

1. The stormwater flow rates created by a rain event are great enough for the hgl within the stormwater treatment system to be above the specialized internal components.
2. The specialized interior components become substantially full of debris such that the debris inhibits flow through the specialized components.
3. A combination of both the stormwater flow rates created by a rain event being great enough, and the amount of debris within the treatment system adequate to inhibit flow.
4. The hgl of a receiving body of water becoming adequately elevated, whereby the hgl in the receiving body of water becomes conveyed into the stormwater treatment system. Such a condition is often referred to as the conveyance, which includes the treatment system, having a tailwater condition.

In general, when the hgl within a stormwater conveyance becomes adequately elevated, the functionality of the stormwater treatment system needs to have the capability to shift from stormwater treatment to flood prevention. The functional relationship between treatment and flood prevention is site and application specific criteria.

Second Embodiment, Includes First Embodiment with Media

FIG. 12 is a side cross sectional view of a second embodiment 80 dual vortex baffle box/vault system 80 with flow spreader 10, screened deflector 13, debris ramp 12 dual vortex baffle box/vault system 50, and screened media vessel 90.

FIG. 13 is a top view of the box/vault system 80 of FIG. 12 along arrow 13X. FIG. 14 is an upper front right perspective view of the box/vault system 80 of FIG. 12. FIG. 15 is an upper rear left perspective view of the box/vault system 80 of FIG. 12.

Referring to FIGS. 12-15, this embodiment 80 is similar to the previous embodiment with the addition of the screened media vessel 90. Media vessel 90 can be a box shape having screened sides and screen bottom. The media vessel 90 can have screens with openings that can range from approximately ⅛ of an inch to approximately 2 inches in diameter, and be either uniform diameters or combinations of different diameters as needed.

Filtration media 95 can be placed into the media vessel 90 between the skimmer baffle 30 and the outflow pipe 8. Types of filtration media 95 that can be used include but are not limited to those described in U.S. Pat. Nos. 7,824,551; 7,955,507; 8,002,984; 8,002,985; and 8,153,005 to Wanielista et al., and in parent patent application Ser. No. 15/658,864 filed Jul. 25, 2017, to Happel, which are all incorporated by reference in their entirety.

The filtration media 95 can be contained within vessel 90 so that the water flow cannot dislodge the media and wash it down stream. Water flow can be diverted downward by the skimmer baffle 30, and then the water flow will upflow through the media 95 in the media vessel 90. As the water passes through the media sorbent surfaces, physical filtration, and biological activity will act to capture pollutants.

Upflow Filtration System:

Referring to FIGS. 12-15, hydrodynamic separation and capture of solid debris constitutes only a portion of the pollutants that are conveyed by stormwater flow. A good method to better address the capture of these additional pollutants will be to include filtration media 95 in a stormwater treatment system. Because media filtration 95 has a tendency to become clogged and flow little to no water, an ideal location to apply media filtration is downstream and within the treatment vault, from the zones and systems that specialize in the capture of solids.

The system 80 can have a media filtration system 90/95 positioned between the skimmer 30 and the treatment vault outflow opening 8. At this location the water flow that reaches the filtration media 95 has been pretreated by settling chambers, screen systems 50, 60, 70, and oil filtration media 45. Because of the high level of pretreatment upstream from the filtration media 95, the filtration media 95 can last longer, flow more water, and require less servicing. The selection of the type of filtration media 95 that is applied is not limited and can depend on the type of pollutants being targeted.

The flow path of the stormwater within the system 80 is that the skimmer 30 can direct the water flow downward toward the underside of the filtration media chamber 90, water flow will then flow upwards through the filtration media 95, the pass through an upper screen system above the filtration media 95. A porous substructure will span approximately the entire underside of the media chamber, and the top cover of the filtration media chamber 90 can also be porous.

Third Embodiment, Includes First Embodiment with Hydroslide

FIG. 16 is a side cross sectional view of a third embodiment dual vortex baffle box/vault system 100 with flow spreader, screened deflector, debris ramp, dual screen systems 50 and hydroslide servicing system. FIG. 17 is a top view of the box/vault system 80 of FIG. 16 along arrow 17X. FIG. 18 is an upper front right perspective view of the box/vault system 100 of FIG. 16.

FIG. 18A is an enlarged view of a single spray lever 140 in horizontal orientation. FIG. 18B is another view of the spray lever 140 of FIG. 18A bent downward.

FIG. 19 is an upper rear left perspective view of the box/vault system 100 of FIG. 16. FIGS. 19A, 19B and 19C are side views of the box/vault system 100 of FIG. 16 showing how the hydroslide knives 130 and levers 140 move the sediment. FIGS. 19D, 19E and 19F are side views of the box/vault system 100 of FIG. 16 showing additional views how the hydroslide knives 130 and levers 140 move the sediment.

Referring to FIGS. 16-19F, this embodiment is similar to the first embodiment with the addition of the hydroslide system. The hydroslide system 100 can include 105 water connection(s) 105 that are generally accessible through access points 7 in the top of the box/vault that connect to exterior water sources. The water connections 105 are attached to upper horizontal water line(s) 180 which can feed into vertical water line(s) 110 and down to spray bar(s) 120 that can be located along side floor corners of the sloped floor 40. Each of the spray bar(s) can include spray head(s) 125 which direct water sprays generally perpendicular to the spray bars 120 and onto the sloped floor 40. Spray knives 130 and spray levers 140 can be attached to the spray bars 120 along the bottom of the sloped floor 40 of the system 100.

These types of hydroslide systems 10 shown in FIGS. 16-18 can operate similar to those described in U.S. patent application Ser. No. 15/686,931 filed Aug. 25, 2017, and U.S. patent application Ser. No. 15/639,685 filed Jun. 30, 2017, which claims the benefit of priority to U.S. Provisional Patent Application Ser. No. 62/506,188 filed May 15, 2017; and U.S. patent application Ser. No. 14/288,455 filed May 28, 2014, which claims the benefit of priority to U.S. Provisional Application Ser. No. 61/828,958 filed May 30, 2013. The entire disclosure of each of these listed applications are incorporated herein by specific reference thereto.

Referring to FIGS. 16-19F, the high pressure water servicing system can dramatically reduce the required time to remove the captured debris in the lower chambers. The servicing system has high water pressure jets that will flush captured debris toward the center of the settling chambers. These jets will liquefy the captured debris from underneath, turn the captured debris into a slurry, and then flush the debris slurry toward the center of the settling chambers so that a vacuum truck can easily remove the slurry.

The use of this high pressure servicing system avoids the need for a service technician to enter the vault to perform servicing. The regulations set by OSHA for personnel to enter a confined space, such as a storm water treatment system for servicing, are complicated, time consuming, and costly.

Servicing the Invention:

Referring to FIGS. 16-19F, stormwater flow will convey pollution into the stormwater treatment vault and debris will accumulate in the debris collection screen systems and the lower settling chambers. To perform the servicing a vacuum service truck will be required to remove the captured debris. Access to the screen systems and the lower settling zone can be achieved by a service crew from outside the treatment vault.

The vacuum truck will be able to access the dual debris capture screen systems with the service vacuum line. If there is a lid present across the tops of the screen system, this lid will be opened and the vacuum service line will be able to reach inside and the captured debris can be vacuumed out.

During servicing all the debris that has settled into the lower settling chamber or chambers will be removed by a vacuum service truck. There will be an opening between the dual screen systems that is adequately sized so that a vacuum service truck can access the lower settling chamber or chambers during servicing. The vacuum truck service line will be able to fit between the dual debris capture screen systems and reach to the bottom of the settling chambers. For servicing the first chamber, in which the flow spreader is located, the vacuum service line will be able to reach around the flow spreader to the floor of the chamber.

A vacuum truck and its associated service crew have an operating expense that is significant. In addition, the number of stormwater treatment systems that can be serviced by a vacuum truck and its crew is limited and dependent on the length of time spent doing each servicing. The greater the time it takes to perform the service work of the treatment system, the fewer treatment systems can be serviced in a day. Time translates into money if both the capitalization of the vacuum truck and the labor costs of the service crew. A vacuum truck and service crew that can service a greater number of stormwater treatment systems in a day will have a lower cost per servicing which can produce significant savings.

For the purpose of reducing servicing time, the invention can have a high-pressure spray system added to the settling zone of the treatment system. This spray system will consist of high-pressure pipe that conveys clean servicing water into the settling zone of treatment system. The conveyance of the servicing water is such that water is inserted at high-pressure from a source outside the vault of the treatment system, is conveyed to the bottom of the settling zone, where the servicing water flows into spray bars located along the perimeter of the settling zone. These spray bars have nozzles aimed toward the center of the settling and are approximately parallel with the floor of the settling zone.

Over time, solids will settle into the settling zone of the treatment system and form a layer across the bottom of the settling zone. When servicing using the spray system, the nozzles along the spray bars will jet servicing water at high velocity into the solids that have settled in the settling zone. These water jets will drill into the solids and liquefy the solids layer from the underside. The kinetic energy of the water jets will eventually drive the solids toward the center of the settling zone where the vacuum nozzle of the vacuum service truck can easily reach and extract the solids from the treatment system. To aid with driving the sediments toward the center of the settling zone, the floor of the settling zone can be angled such that the floor is sloped downward from the perimeter of the settling zone toward the center of the settling zone.

The invention can include a high-pressure servicing spray system for multiple settling zones. This will require a spray system for each settling zone or chamber. These spray systems will enable removing captured debris from the settling chambers quickly and easily, and without a service technician having to enter the treatment vault to facilitate servicing. Access to the bottom of the settling chambers, around the screen systems and flow spreader, will be attained by a vacuum service truck. All the debris can easily be removed from the settling zone of the treatment system. Without the servicing spray system certain areas in the settling zone may be difficult a vacuum service truck to access. It is common that when a service technician has difficulties doing the work, the technician may not do a complete job, resulting in debris being left behind in the treatment vault.

The before described method of using a high-pressure spray system to aid with the removal of solids that have settled into the settling zone of a treatment system will achieve the following results:

1. Much less servicing water will be required to perform the servicing of the treatment system.
2. The time spent removing debris from the settling zone of the treatment system will be dramatically reduced. Saving time will save money.
3. Because the servicing time of the treatment system is reduced, the vacuum truck and crew can service more treatment systems in a day. Each vacuum truck can accomplish more tasks which reduce the need to capitalize more equipment which save money.
4. The servicing spray system is especially effective with quickly removing all the debris in the settling zone. There is no need to send a person inside the confined space of the treatment vault to do service work. This avoids a service crew having to deal with OSHA confined space protocols which will slow the servicing process and require additional personnel to do the service work.

Fourth Includes First Embodiment with Hydroslide & Media

FIG. 20 is a side cross-sectional view of a fourth embodiment dual vortex baffle box/vault system 150 with flow spreader 10, debris ramp 12, screened deflector 13, dual screened system 50, with hydroslide servicing system 100 and screened media vessel 90 with media 95. FIG. 21 is a top view of the box/vault system of FIG. 20 along arrow 21X. FIG. 22 is an upper front right perspective view of the box/vault system 150 of FIG. 20. FIG. 23 is an upper rear left perspective view of the box/vault system 150 of FIG. 20.

Referring to FIGS. 20-23, this embodiment combines the previously described hydroslide servicing system 100 and the previously described media vessel 90 and media 95 with the flow spreader 10 and debris ramp 12 and screened deflector 13.

Fifth Embodiment Includes First Embodiment with Large Flow Spreader

FIG. 24 is a side cross-sectional view of a fifth embodiment of a dual vortex baffle box/vault system 200 with large flow spreader 210, debris ramp 12 and screened deflector 13 with dual screened systems 50, 60, 70. FIG. 25 is a top view of the box/vault system 200 of FIG. 24 along arrow 25X. FIG. 26 is an upper front right perspective view of the box/vault system 200 of FIG. 24. FIG. 27 is an upper rear right perspective view of the box/vault system 200 of FIG. 24.

Referring to FIGS. 24-27, the system 200 is similar to the first embodiment with the exception of having a large flow spreader 210 which is substantially larger than the flow spreader 10 shown and described in the previous embodiments.

The large flow spreader 210 can have a tip end closer to the front inflow inlet 2 than to the first baffle 14. Also, the large flow spreader 210 can have a bottom attached to the floor 40, while the other flow spreader 10 as a bottom spaced above the floor 40. The operation of the system 200 can function similar to the previous embodiments in flow.

A large flow spreader 210 can have a tip end extending more than halfway between the first baffle and inlet wall. The larger the flow spreader, the less headloss that can occur.

The large flow spreader 210 can have a solid surface or a surface with openings, such as screened openings, and the like. The screened surface can allow filtering out of debris, and the like from passing into the dual screen systems 50, 60, 70.

The larger the flow spreader 210, reduces the chances of solids, debris, passing therethrough.

Sixth Embodiment Includes First Embodiment with Large Flow Spreader & Hydroslide FIG. 28 is a side cross-sectional view of a sixth embodiment of a dual vortex baffle box/vault system 250 with large flow spreader 210, debris ramp 12, screened deflector 13 and hydroslide servicing system 100. FIG. 29X is a top view of the box/vault system 250 of FIG. 28 along arrow 29X. FIG. 30 is an upper front right perspective view of the box/vault system 250 of FIG. 28. FIG. 31 is an upper rear left perspective view of the box/vault system 250 of FIG. 28.

Referring to FIGS. 28-31, the system 250 includes the previous embodiment 200 with a hydroslide system 100 as previously described.

Seventh Embodiment Includes First Embodiment with Convex Large Flow Spreader

FIG. 32 is a top perspective view of a seventh embodiment of a dual vortex baffle box/vault system with large convex flow spreader 300, debris ramp/screened deflector 12, 13 with dual screened system 50.

Eighth Embodiment Includes First Embodiment with Concave Large Flow Spreader

FIG. 33 is a top perspective view of a seventh embodiment of a dual vortex baffle box/vault system with large concave flow spreader 350, debris ramp/screened deflector 12, 13 with dual screened system 50.

Problems Solved by the Invention

There are at least eighteen (18) problems solved by the invention:

1. Problem: As stormwater flow enters a stormwater treatment system the velocity of the incoming water flow relatively high and can create significant turbulence within the treatment system. This turbulence can cause pollutants that has previously settled into lower setting chambers to re-suspend and escape the treatment system. Turbulent water flow will prevent pollutants entering the treatment vault from being able to settle into the settling chambers and eventually escape the treatment system.

Solution: The flow spreader in the invention, which is located adjacent to the inflow of the treatment system, will spread the flow wide within the treatment system. The width of the treatment system is significantly wider than the inflow opening. The result of spreading the flow wide in the treatment system is the linear velocity will be greatly reduced and the water flow will become relatively placid and calm. Calming the stormwater flow will avoid the potential for previously pollutants to re-suspend and enable pollutants entering the treatment system to continue to accumulate in the settling chambers.

2. Problem: Litter and foliage are commonly conveyed in stormwater flow, and are regarded as primary pollutants of concern. Most stormwater treatment systems store all captured pollutants in a water filled settling chamber between rain events. If these types of pollutants are stored in a wet environment between rain events, over time the chemistry contained in these pollutants will leach out of the debris and dissolve into the water within the treatment system. Eventually, it will rain again, and when the water that had been in the treatment system is flushed out and conveyed downstream to a receiving body of water, so will the pollutants that leached out of the debris.

Solution: The invention has dual screen systems that are elevated above the static water level within the stormwater treatment system. Solid pollutants are much easier to capture and retain that liquid pollutants. The debris capture screen systems will store pollutants in a dry state between rain events. Being able to store captured pollutants in a dry state prevents the solids from leaching dissolved chemistry into the water, thus the water is not able to convey these pollutants downstream.

3. Problem: It is ideal for floating debris that enters the invention to be captured and retained within the debris separating screen systems.

However, because the screens are elevated above the static water level, it is possible this debris may not enter the screen systems and remain in the static water level within the first chamber. If this debris is unable to enter the screen systems and remain in the first chamber, this debris may sink and over time pollutants therein will leach into the water. When it rains again at a later date, these pollutants would be conveyed with the water flow out of the treatment system and into a receiving body of water.

Solution: A deflector that functions as a debris ramp at the inflow to the screen systems will aid with making it much easier for debris to enter into the screen systems. In the first settling chamber a deflector can be positioned adjacent to the bottom of the opening of the dual screen systems. This deflector is generally angled downward from the inflow into the screen systems and will serve to both reduce turbulence in the first chamber, and direct debris into the bodies of the debris separating screen systems. This deflector will be positioned such that it fits between the flow spreader and sidewall of the treatment vault, which will serve to direct debris into the screen systems.

5. Problem: Located behind in the first chamber, and between the screen system and top of the baffle, is an opening which can potentially pass debris. In addition, the deflector which is also a debris ramp can also have floating debris trapped underneath. If this debris is unable to enter the screen systems and remain in the first chamber, this debris may sink and over time pollutants therein will leach into the water. When it rains on a later date, these pollutants that have been leached into the water will be conveyed with the water flow out of the treatment system and into a receiving body of water.

Solution: The shape and position of this screened barrier will be such that it will be angled downward from the upstream edge of the first chamber deflector and seal off against the baffle wall and flow spreader. At this position the screened barrier will have debris that may accumulate on the surface of the screen, pushed off by water flow that is moving along the surface of the flow spreader. The water flow will effectively clean the barrier screen and prevent the barrier from becoming blinded by debris. Because the screened deflector is angled adequately and attached to the upstream edge of the debris ramp, floating debris will not be able to accumulate under the debris ramp.

6. Problem: As water flow enters a stormwater treatment system with a screen system or netting, there will be a tendency for the velocity of the water flow, and associated hydraulic pressure, to jam debris into the openings of the screen or netting. If the hydraulic pressure is adequately forceful, the debris can be forced into the openings such that little to no water flow can pass through the opening and the screen can become blinded. A fully blinded screen system may have little volume of captured pollutants, and the removal efficiency of the treatment system will be significantly less if the screen system become blinded.

Solution: The invention has a flow spreader that that can have a surface made of a screen material. The screen material of the flow spreader is such that solids that are typically captured in the debris capture screen systems will not be able to pass through the screen of the flow spreader. However, water flow can pass through the flow spreader. The debris will continue to travel and enter the screen systems and water will be able to pass through the flow spreader. Because a significant amount of water flow can pass through the flow spreader, the effect will be that less water pressure will be present inside the screen systems, and debris will not be likely to be jammed into the holes in the screen system. Because the debris is not jammed into the screens, after each rain event the debris will fall away from the side screens and settle across the bottom of the screen systems. Being able to reduce the water pressure that presses debris against the screens of the debris separating screen system 7. Problem: During high flowing rain events the hgl inside a stormwater treatment system will be elevated. In the event that the hgl is elevated above a debris capturing screen system, the debris previously captured in the screen system can float out the top of the screen system, escape the treatment system, and be conveyed into a downstream receiving body of water.

Solution: The invention can have lids can be placed on top of each of the screen systems. These lids can be screened such that the debris cannot escape the screen system, however, water flow can pass through the screened lids. These lids can be hinged or removed to open the debris separating screen so that service crews can easily remove captured debris during servicing.

8. Problem: Stormwater flow typically includes oils and other lighter the water liquids. Hydrocarbons are a common pollutant of concern. Screens and settling chambers are not able to capture these lighter that water liquids. In addition to lighter that water liquids, small floating debris can also pass through screens. These lighter than water liquids and tiny floating debris will be conveyed out of a stormwater treatment system unless there is a method of dealing with these pollutants. Solution: The invention can have a skimmer positioned between the downstream end of the screen systems and before the outflow opening of the treatment vault. The skimmer will be such that the bottom of the skimmer is vertically positioned below the bottom of the outflow opening. The bottom of the skimmer will remain submerged during static water conditions. The skimmer will span the width of the stormwater treatment vault. The invention's skimmer will act to prevent lighter that water liquids and tiny debris from passing because these pollutants will remain floating on top of the water and unable to pass through the skimmer. Below the water surface, where the water is free of floating debris and lighter than water liquids, water flow can pass under the skimmer.

9. Problem: When stormwater is flowing, lighter than water liquid pollutants such as oils and assorted hydrocarbons can temporarily collect along the upstream side of a skimmer system inside of a treatment system. Over time and the consequence multiple rain events, these pollutants will mix with water flow and escape the treatment system and conveyed to a receiving body of water.

Solution: The invention has a method for capturing these lighter than water pollutants. Filtration media that is primarily specific to the capture of oil and hydrocarbons can be utilized by positioning this media between the dual debris capture screen systems and upstream from the skimmer. Hydrocarbon media can be placed inside of sleeves of fabric or netting to make booms. Then these booms can float in front of the skimmer or be placed inside of a cage or containment screen to keep them in place. When servicing the treatment system these hydrocarbon booms can be replaced.

10. Problem: When stormwater flow enters into a treatment system, the treatment system will alter the water flow such that the flow volume is reduced due to changes in kinetic energy of the flowing water. Slowing the water flow creates a physical constraint of the water flow that is commonly referred to as headloss. A treatment system that creates too much headloss has the potential to cause flooding upstream. Generally, the greater the flow volume, the greater potential is for headloss.

Solution: The invention has the ability to bypass stormwater flows within the treatment vault when the flow rates exceed what can be passed through the specialized internal components. The sizing of the specialized internal components of the invention is such that, if for any reason the hgl in the treatment system reaches a predetermined elevation within the treatment system, the water flow can bypass over top of all the specialized interior components. Because the width of the treatment vault is significantly greater than that of the inflow or outflow pipes, the potential flow above the specialized interior components is adequate to convey the maximum conveyance of the inflow and outflow pipes with minimal increase in the hgl above the interior components. Most rain events do not produce stormwater flows that result with an hgl that can top the interior components of the invention, so the need to bypass water flow is relatively infrequent.

11. Problem: The debris that settles in the settling zone of the stormwater treatment system is commonly a high concentration of sediment.

Sediment in a settling zone forms a layer that covers the bottom of the settling zone, and the sediments can tightly pack together and become hard. It can be very difficult for a service crew to remove these tightly packed sediments from the setting zone. The longer it takes for a service crew to perform the servicing of the treatment system, the more money it costs to perform the servicing and the longer servicing equipment is engaged to a single task.

Solution: The invention can use a high-pressure spray system added to the settling chambers of the treatment system which will dramatically reduce the time required to service the settling zone of a stormwater treatment system. This spray system will consist of high-pressure pipe that conveys clean servicing water into the settling zone of treatment system. The conveyance of the servicing water is such that water is inserted at high-pressure from a source outside the vault of the treatment system, is conveyed to the bottom of the settling chambers, where the servicing water flows into spray bars located along the perimeter of the settling chambers. These spray bars have nozzles aimed toward the center of the settling chamber and are approximately parallel with the floor of the settling zone. When servicing using the spray system, the nozzles along the spray bars will jet servicing water at high velocity into the solids that have settled in the settling chamber. These water jets will drill into the solids and liquefy the solids layer from the underside. The kinetic energy of the water jets will eventually drive the solids toward the center of the settling chambers where the vacuum nozzle of the vacuum service truck can easily reach and extract the solids from the treatment system. To aid with driving the sediments toward the center of the settling chambers, the floor of the settling zone can be angled such that the floor is sloped downward from the perimeter of the settling chambers toward the center of the settling chambers.

12. Problem: When servicing the settling zone of a stormwater treatment system it is often required for a service technician to enter the confined space of a settling zone to facilitate the removal of debris that has settled in the settling zone. Inside the setting zone is uncomfortable and potentially dangerous place for a service technician to be. For a service technician to enter the confined space of a settling zone requires safety protocols outlined by OSHA which are costly and time consuming.

Solution: The invention can use a high-pressure spray system added to the settling zone (settling chambers) of the treatment system which can be administered by a service technician from outside the stormwater treatment system. This spray system and method of application is more thorough for removing debris from the settling zone of the treatment system than other methods, and no service technicians need to enter the stormwater treatment vault to employ the servicing spray system.

13. Problem: Servicing technicians will often not complete the removal of all the debris that has settled in the settling zone of a stormwater treatment system because servicing a settling zone can be difficult and time consuming. The result is that the amount of debris removed from the treatment system is less. Because the amount is debris removed from a stormwater treatment system is tracked and documented for the purpose of giving removal credits to the owner of the treatment system, leaving debris behind in the settling zones reduces the credits issued to the owner. For the owner of the treatment system to not receive maximum removal credits may eventually cost the owner additional funding in an attempt to meet regulatory pollution removal objectives.

Solution: The invention can use a high-pressure spray system added to the settling zone of the treatment system which makes it easy and quick for service technicians to remove all the debris that has settled in the settling zone of the stormwater treatment system. The invention's spray system is very thorough for the removal of debris in the settling zone. Because of the ease and speed of the inventions spray system the service technicians will be inspired to do a better job and remove all the debris in the settling zone for full credit by regulatory agencies. The spray servicing system of the invention saves money and increases the measured removal efficiency of the treatment system.

14. Problem: Debris that has become tightly packed across the bottom of the settling zone of a stormwater treatment system can become structurally stable. Tightly packed sediments combined with leaves, branches, and twigs can create a structural framework with the debris. The high-pressure spray system is designed to drill into the debris from the perimeter of the setting zone and force the debris toward the center of the settling zone for removal by a vacuum service truck. However, the structural framework within the debris can the debris layer to be fully undermined by the water jets that are aimed parallel with the floor of the settling zone. The result is a layer of debris that is supported above the water jets by the side walls of the settling zone and the structural framework of the debris. All the debris is unable to collapse downward and be driven toward the center of the vault toward the vacuum service line.

Solution: As a part of the invention, a vertical spray bar member will be added to the horizontal spray bars midway between 2 walls on opposite sides of the settling zone. These vertical spray bar members will have a series of nozzles that will direct water jets to drill into the sediment layer, creating a vertical slice through the debris such that the slice will create a structural failure within the debris layer, which will in turn cause the layer of debris to collapse onto the water jets that are aimed parallel with the floor. Once the structure of the debris is overcome the water jets aimed parallel with the floor can fully liquefy the debris and drive it toward the center of the settling zone where the service vacuum truck can remove the debris.

15. Problem: When installing the high-pressure spray system of the invention, having the nozzles of the horizontal spray bar aimed parallel with the floor of the settling zone is important to achieve maximum effectiveness. The technician installing these spray bars need to accomplish the installation quickly and accurately. Doing the installation quickly will save money and installing accurately will ensure effectiveness. To further complicate the installation of the spray bars, the slope of the floors of the settling zones will vary between stormwater treatment vaults due to workmanship issues. In addition, the nozzles are small and difficult to judge as to the direction they are aimed.

Solution: As a part of the invention, each of the horizontal spray bars will have an aiming lever added as a part of manufacturing the spray bars. The aiming lever will such that the aiming lever will be perpendicular to the length of the spray bars and parallel with the aim of the nozzles. The aiming lever will serve as an aiming mechanism for the installation technician. As a part of installing the spray bars of the spray system, the installation technician will position the aiming lever so that it is pressed against the floor of the settling zone of the stormwater treatment system. Since the nozzles are aimed parallel with the aiming lever, the nozzles will always be aimed parallel with the floor of the settling zone, regardless of the slope of the floors.

15. Problem: Stormwater treatment systems commonly store all captured debris in the same lower setting chambers that are also indefinitely filled with water whether it is raining and stormwater is flowing or not. Between rain event and over time, some types of debris, such as leaves and grass, will leach out their nutrient pollutant loads into the surrounding water. In doing so the nutrient pollutant load contained in the water is increased. When it rains again at a later date, when the water in the treatment system is flushed out, this pollutant load will be conveyed downstream into a receiving body of water. Solution: The invention has dual screen systems located along each side of the treatment vault, such that, the bottoms of the screen systems are elevated above the static water level within the treatment system. Captured debris, such as leaves and grass, are not stored in the lower settling chambers between rain events. The debris is stored in a dry state between rain events and is not in contact with the water below. The nutrient pollutant load contained within the debris will not leach into the water below and will remain in the foliage until the treatment system is serviced by a vacuum truck when the debris is properly disposed of.

17. Problem: Hydrodynamic separation and capture of solid debris constitutes only a portion of the pollutants that are conveyed by stormwater flow. Screen systems and setting chambers can capture larger particles of debris that may either float or settle such as, but not limited to, litter, sediments, and foliage. However, there are many types of pollutants that cannot be captured screens or settling chambers. The other types of pollutants are referred to as dissolved in the water, such as nutrients, metals, and others. Solution: The invention can have a media filtration system positioned between the skimmer and the treatment vault outflow opening. At this location the water flow that reaches the filtration media has been pretreated by settling chambers, screen systems, and oil filtration media. Because of the high level of pretreatment upstream from the filtration media, the filtration media will last longer, flow more water, and require less servicing. The selection of the type of filtration media that is applied is not limited and can depend on the type of pollutants being targeted.

18. Problem: Filtration media has a tendency to become clogged and flow little to no water. A media filtration system that becomes clogged or substantially clogged will have a significantly diminished removal efficiency of pollutants from stormwater. To restore the water flow through clogged filtration media inside a stormwater treatment system will require that the filtration media be serviced. Servicing typically requires the filtration media to be replaced by a service crew and their associated equipment. Servicing a stormwater treatment system costs money, and the more often filtration media requires servicing, the greater the operating expense of the stormwater treatment system.

Solution: The invention places the filtration media chamber downstream from the skimmer and adjacent to the treatment vault outflow. This enables maximum pretreatment within the invention by the specialized interior components upstream from the skimmer. The cleaner the stormwater is when it reaches the filtration media chamber the less likely the filtration media will become clogged, resulting with the media lasting longer. In addition, arraigning the water flow such that the water flow moves upward through the filtration media, rather than downward or horizontal through the filtration media, reduces the potential for clogging.

A comparison between the subject invention and previous patents of the applicant will now be discussed:

| Suntree Pat. no: 6,428,692 vs the New Invention: | |
|---|---|
| Pat. No: 6,428,692 Inline Storm Water Drain System | New Invention |
| Does not have lids on top of the screen system to prevent debris from escaping. | Has screened lids on top of the screen system to prevent debris from escaping. |
| The screen system his hinged to give a vacuum truck access to the lower settling chambers. The screen system is centrally located in the treatment vault. | Has dual screen systems that are separated such that there is a screen system along each side of the treatment vault. Access to service the lower settling chambers does not require the screens to be hinged. An open space between the screen systems along the center of the treatment vault gives clear access for a vacuum truck to the lower settling chambers. |
| Does not have a skimmer between the screen system and the outflow opening. | Has a skimmer system between the screen systems and the outflow opening. |
| Does not have a high pressure servicing system to speed the removal of debris that has settled in the lower settling chamber. | Has a high pressure servicing system to speed the removal of debris that has settled in the lower settling chamber. The high pressure servicing system will make servicing the treatment vault much faster with will save time and money, and service personnel will not be required to enter the vault to expedite servicing. |

| Suntree Pat. No: 6,428,692 Inline Storm Water Drain System | New Invention |
|---|---|
| Does not have a flow spreader that aids with spreading the water flow wide to assist with reducing the linear velocity of the water flow. | Does have a flow spreader that spreads the flow wide as the flow enters the treatment vault. The flow spreader will act to spread the flow wider and soon, resulting in greater calming of turbulence within the treatment system. |
| The hydraulics produces a greater water pressure within the screen system which will cause debris to become jammed in the screen openings, resulting in the screen system blinding and not conveying water. The consequence of the screens blinding will be for the removal efficiency to decrease. | The flow spreader and dual screen systems combine to provide more available screen surface area and less water pressure within the screen systems. The result is the debris in the screen systems do not become jammed into the screen openings and will fall off the screen surfaces after the rain event has ended. Because the screens don't become blinded, the removal efficiency will remain relatively high and not decrease. |
| Does not have a screened deflector that prevents floating debris from passing between the bottom of the screen system and the top of the baffle. | Has a screened deflector that prevents floating debris from passing between the bottom of the screen system and the top of the baffle. |

| Suntree Pat. no: 7,270,747 vs the New Invention: | |
|---|---|
| Pat. No: 7,270,747 Storm Water Drain System | New Invention |
| The screen system is centrally located in the treatment vault. The screen system has hinged doors to give a vacuum truck access to the lower settling chambers. | Has dual screen systems that are separated such that there is a screen system along each side of the treatment vault. Access to service the lower settling chambers does not require the screens to be hinged. An open space between the screen systems along the center of the treatment vault gives clear access for a vacuum truck to the lower settling chambers. |
| Does not have a skimmer between the screen system and the outflow opening. | Has a skimmer system between the screen systems and the outflow opening. |
| Does not have a high pressure servicing system to speed the removal of debris that has settled in the lower settling chamber. | Has a high pressure servicing system to speed the removal of debris that has settled in the lower settling chamber. The high pressure servicing system will make servicing the treatment vault much faster with will save time and money, and service personnel will not be required to enter the vault to expedite servicing. |
| Does not have a flow spreader that aids with spreading the water flow wide to assist with reducing the linear velocity of the water flow. | Does have a flow spreader that spreads the flow wide as the flow enters the treatment vault. The flow spreader will act to spread the flow wider and soon, resulting in greater calming of turbulence within the treatment system. |

| Suntree Pat. No: 7,270,747 Storm Water Drain System | New Invention |
|---|---|
| The hydraulics produces a greater water pressure within the screen system which will cause debris to become jammed in the screen openings, resulting in the screen system blinding and not conveying water. The consequence of the screens blinding will be for the removal efficiency to decrease. | The flow spreader and dual screen systems combine to provide more available screen surface area and less water pressure within the screen systems. The result is the debris in the screen systems do not become jammed into the screen openings and will fall off the screen surfaces after the rain event has ended. Because the screens don't become blinded, the removal efficiency will remain relatively high and not decrease. |
| Does not have a screened deflector that prevents floating debris from passing between the bottom of the screen system and the top of the baffle. | Has a screened deflector that prevents floating debris from passing between the bottom of the screen system and the top of the baffle. The flow spreader directs water flow toward the screened deflector. The flow coming off the flow spreader will push off any debris that may accumulate on the screened deflector. The water flow keeps the screened deflector clean and fully functional. |
| Does not have turbulence deflectors in the lower settling chambers. | Has turbulence deflectors in the lower settling chamber. |
| Does not have a screened deflector that prevents floating debris from passing between the bottom of the screen system and the top of the baffle. | The screened deflector prevents floating debris from accumulating under the debris ramp that leads into the bodies of the dual screen systems. This screened deflector is attached to the upstream edge of the debris ramp and the upstream side of the first baffle. It is angled such that floating debris cannot accumulate. |

| Suntree Pat. no: 8,142,666 vs the New Invention: | |
|---|---|
| Pat. No: 8,142,666 Baffle Box Deflectors & Flow Spreaders | New Invention |
| Has no screen systems | Has dual screen systems that are separated such that there is a screen |

| Suntree Pat. no: 8,142,666 vs the New Invention: | |
| --- | --- |
| Pat. No: 8,142,666<br>Baffle Box Deflectors &<br>Flow Spreaders | New Invention |
| | system along each side of the treatment vault. Access to service the lower settling chambers does not require the screens to be hinged. An open space between the screen systems along the center of the treatment vault gives clear access for a vacuum truck to the lower settling chambers. |
| Does not have a skimmer between the screen system and the outflow opening. | Has a skimmer system between the screen systems and the outflow opening. |
| Does not have a high pressure servicing system to speed the removal of debris that has settled in the lower settling chamber. | Has a high pressure servicing system to speed the removal of debris that has settled in the lower settling chamber. The high pressure servicing system will make servicing the treatment vault much faster with will save time and money, and service personnel will not be required to enter the vault to expedite servicing. |
| Does not have a flow spreader with a surface made of screen that aids with spreading the water flow wide and to filter water flow. | Does have a flow spreader with a screened surface that spreads the flow wide as the flow enters the treatment vault. The flow spreader will act to spread the flow wider and sooner, and will sieve solids out of the water flow. The result is better solids removal and greater calming of turbulence within the treatment system. |
| Does not have filtration media that is capable of removing oils and various types of lighter than water liquids. | Has a filtration media system that is capable of removing oils and various types of lighter than water liquids. |

| Suntree Pat. no: 8,366,923 vs the New Invention: | |
| --- | --- |
| Pat. No: 8,366,923<br>Telescoping Post Supports<br>and Sliding Lid Systems<br>for Filter Baskets | New Invention |
| The screen system is centrally located in the treatment vault. Because the screen system is centrally located within the treatment vault, the screen system has hinged doors to give a vacuum truck access to the lower settling chambers. | Has dual screen systems that are separated such that there is a screen system along each side of the treatment vault. Access to service the lower settling chambers does not require the screens to be hinged. An open space between the screen systems along the center of the treatment vault gives clear access for a vacuum truck to the lower settling chambers. |
| As water flow and debris enters the treatment vault, they are immediately conveyed into the body of the screen system which is above the flow spreader. The flow spreader on the upstream side of the first baffle does not engage the water flow and debris until after it has been sieved by the upper screen system. The flow spreader does not perform any significant sieving function. | As water flow and debris enters the treatment vault, they immediately engage the flow spreader. The flow spreader performs a significant role in dissipating the kinetic energy of the stormwater flow before the flow enters into the dual debris capture screen systems. The flow spreader can also sieve the stormwater flow performing a significant measure of separating debris from the stormwater flow. |
| Does not have a high-pressure servicing system to speed the removal of debris that has settled in the lower settling chamber. | Has a high-pressure servicing system to speed the removal of debris that has settled in the lower settling chamber. The high-pressure servicing system will make servicing the treatment |

| Suntree Pat. no: 8,366,923 vs the New Invention: | |
| --- | --- |
| Pat. No: 8,366,923<br>Telescoping Post Supports<br>and Sliding Lid Systems<br>for Filter Baskets | New Invention |
| | vault much faster with will save time and money, and service personnel will not be required to enter the vault to expedite servicing. |
| The hydraulics produces a greater water pressure within the screen system which will cause debris to become jammed in the screen openings, resulting in the screen system blinding and not conveying water. The consequence of the screens blinding will be for the removal efficiency to decrease. | The flow spreader and dual screen systems combine to provide more available screen surface area and less water pressure within the screen systems. The result is the debris in the screen systems do not become jammed into the screen openings and will fall off the screen surfaces after the rain event has ended. Because the screens don't become blinded, the removal efficiency will remain relatively high and not decrease. |
| Does not have a screened deflector in the first settling chamber that prevents floating debris from passing between the bottom of the screen system and the top of the baffle. | Has a screened deflector that prevents floating debris from passing between the bottom of the screen system and the top of the baffle. The flow spreader directs water flow toward the screened deflector. The flow coming off the flow spreader will push off any debris that that may accumulate on the screened deflector. The water flow keeps the screened deflector clean and fully functional. |
| Does not have a screened deflector in the first chamber that prevents floating debris from passing between the bottom of the screen system and the top of the baffle. | The screened deflector prevents floating debris from accumulating under the debris ramp that leads into the bodies of the dual screen systems. This screened deflector is attached to the upstream edge of the debris ramp and the upstream side of the first baffle. It is angled such that floating debris cannot accumulate. |

| Suntree Pat. no: 8,491,797 vs the New Invention: | |
| --- | --- |
| Pat. No: 8,491,797<br>Telescoping Post Supports<br>and Sliding Lid Systems<br>for Filter Baskets | New Invention |
| The screen system is centrally located in the treatment vault. Because the screen system is centrally located within the treatment vault, the screen system has hinged doors to give a vacuum truck access to the lower settling chambers. | Has dual screen systems that are separated such that there is a screen system along each side of the treatment vault. Access to service the lower settling chambers does not require the screens to be hinged. An open space between the screen systems along the center of the treatment vault gives clear access for a vacuum truck to the lower settling chambers. |
| As water flow and debris enters the treatment vault, they are immediately conveyed into the body of the screen system. There are no deflectors of flow spreaders indicated in the settling zones of the treatment system. | As water flow and debris enters the treatment vault, they immediately engage the flow spreader. The flow spreader performs a significant role in dissipating the kinetic energy of the stormwater flow before the flow enters into the dual debris capture screen systems. The flow spreader can also sieve the stormwater flow performing a significant measure of separating debris from the stormwater flow. |
| Does not have a high-pressure servicing system to speed the | Has a high-pressure servicing system to speed the removal of debris that has |

-continued

Suntree Pat. no: 8,491,797 vs the New Invention:

| Pat. No: 8,491,797 Telescoping Post Supports and Sliding Lid Systems for Filter Baskets | New Invention |
|---|---|
| removal of debris that has settled in the lower settling chamber. | settled in the lower settling chamber. The high-pressure servicing system will make servicing the treatment vault much faster with will save time and money, and service personnel will not be required to enter the vault to expedite servicing. |

Suntree Pat. no: 8,491,797 vs the New Invention:

| Pat. No: 8,491,797 Telescoping Post Supports and Sliding Lid Systems for Filter Baskets | New Invention |
|---|---|
| The hydraulics produces a greater water pressure within the screen system which will cause debris to become jammed in the screen openings, resulting in the screen system blinding and not conveying water. The consequence of the screens blinding will be for the removal efficiency to decrease. | The flow spreader and dual screen systems combine to provide more available screen surface area and less water pressure within the screen systems. The result is the debris in the screen systems do not become jammed into the screen openings and will fall off the screen surfaces after the rain event has ended. Because the screens don't become blinded, the removal efficiency will remain relatively high and not decrease. |
| Does not have a screened deflector within the first settling chamber that prevents floating debris from passing between the bottom of the screen system and the top of the baffle. | Has a screened deflector that prevents floating debris from passing between the bottom of the screen system and the top of the baffle. The flow spreader directs water flow toward the screened deflector. The flow coming off the flow spreader will push off any debris that that may accumulate on the screened deflector. The water flow keeps the screened deflector clean and fully functional. |
| Does not have a screened deflector in the first chamber that prevents floating debris from passing between the bottom of the screen system and the top of the baffle. | In the first chamber, the screened deflector prevents floating debris from accumulating under the debris ramp that leads into the bodies of the dual screen systems. This screened deflector is attached to the upstream edge of the debris ramp and the upstream side of the first baffle. It is angled such that floating debris cannot accumulate. |

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A single treatment system in a stormwater vault, comprising:
a flow spreader forming a hydro-dynamic separation of inflowing water passing through an inlet of the stormwater vault into two flow paths, the stormwater vault having lower settling chambers, the flow spreader creating split flow paths to the left and right of the inflowing water, wherein the split flow assists to influence solids to settle into the lower settling chambers in the stormwater vault; and
dual screen filtration systems in the stormwater vault adjacent to the flow spreader, each of the dual screen filtration systems located on each side of the stormwater vault for receiving the split flow paths, each of the dual screen filtration systems spaced apart from one another, the dual screen filtration systems being above at least one of the lower settling chambers, wherein the hydro-dynamic separation, and the screen filtration systems are all in the single treatment system.

2. The single treatment system of claim 1,
a debris ramp having a left portion to a left side of the flow spreader and a right side portion to a right side of the flow spreader, the debris ramp for allowing debris to pass upward to flow into the dual screen filtration systems.

3. The single treatment system of claim 2, further comprising:
a screened deflector below the debris ramp, the screened deflector for screening debris from passing into the dual screen filtration systems.

4. The single treatment system of claim 3, wherein the screened deflector includes: a flattened expanded screen pattern.

5. The single treatment system of claim 3, wherein the screened deflector includes: a perforated screening.

6. The single treatment system of claim 3, wherein the screened deflector includes: a louver expanded screen.

7. The single treatment system of claim 1, wherein the flow spreader includes a triangular shape with a base and tip edge, wherein the tip of the triangular shape is spaced less than halfway between the base of the triangular shape and the inlet of the stormwater vault.

8. The single treatment system of claim 1, wherein the flow spreader includes a triangular shape with a base and tip edge, wherein the tip of the triangular shape is spaced more than halfway between the base of the triangular shape and the inlet of the stormwater vault.

9. The single treatment system of claim 1, wherein the flow spreader includes: flat angled sides.

10. The single treatment system of claim 1, wherein the flow spreader includes: concave sides.

11. The single treatment system of claim 1, wherein the flow spreader includes: convex sides.

12. The single treatment system of claim 1, wherein each of the dual screen filtration systems include:
a hinged lid, which is used to access and remove debris captured inside of each of the dual screen filtration systems, and space formed between the dual screen filtration systems allows for directly servicing a floor the single treatment system without having to access through the dual screen filtration systems.

13. The single treatment system of claim 1, further comprising:
a pressure water servicing system adjacent a bottom of the treatment system, the pressure water servicing system being used to flush captured debris toward the center of settling chambers.

14. The single treatment system of claim 1, further comprising:
a media vessel holding filtering media therein, the medial vessel being positioned between a skimmer baffle and the outlet side of the vault and below the outlet flow line, with the skimmer baffle between the dual screen system and the outlet side of the vault, wherein water flow is diverted downward by the skimmer baffle then flow upward through the media in the media vessel so that physical filtration and biological activity will capture pollutants from the water flow.

15. A single treatment system for storm water, comprising:
a vault having an inlet side with an inflow line and an outlet side with an outflow flow line, the vault having closed side walls and a floor;
a flow spreader in the vault, the flow spreader facing the inlet side, which splits incoming water from the inflow line into dual paths; and
dual screen filter boxes in the vault, the dual screen filter boxes located along both of the sidewalls of the vault above the floor, the dual filter boxes being parallel to and spaced apart from one another, the flow spreader for allowing debris and floatables to pass upward to flow into the dual screen filtration systems, wherein the parts of the debris and the floatables are captured by the dual screen boxes and prevented from being conveyed to a receiving downstream water body.

16. The single treatment system of claim 15, further comprising:
a debris ramp having a left portion to a left side of the flow spreader and a right side portion to a right side of the flow spreader.

17. The single treatment system of claim 16, further comprising:
a screened deflector below the debris ramp, the screened deflector for screening debris from passing into the dual screen filtration systems.

18. The single treatment system of claim 15, wherein the flow spreader includes: concave sides.

19. The single treatment system of claim 15, wherein the flow spreader includes: convex sides.

20. A single treatment system in a stormwater vault, comprising:
a flow spreader in the vault, the flow spreader having screened side walls, the flow spreader forming a hydro-dynamic separation of inflowing water passing through an inlet of the stormwater vault into two flow paths, the flow spreader splitting flow to the left and right of the inflowing water, wherein the vortex assists to influence solids to settle into lower settling chambers in the stormwater vault; and
dual screen filtration systems in the vault adjacent to the flow spreader, each of the dual screen filtration systems located on each side of the stormwater vault for receiving the two flow paths, each of the dual screen filtration systems spaced apart from one another, and each of the dual screen filtration systems being spaced above at least one of the lower settling chambers in the stormwater vault, wherein the hydro-dynamic separation and the screen filtration systems are all in the single treatment system.

* * * * *